350-403 SR

6/25/85 XR 4,525,413

United States Patent [19]

Rogers et al.

[11] Patent Number: 4,525,413

[45] Date of Patent: Jun. 25, 1985

[54] OPTICAL DEVICE INCLUDING BIREFRINGENT POLYMER

[75] Inventors: Howard G. Rogers, Weston; Ruth C. Bilofsky, Lexington, both of Mass.; Russell A. Gaudiana, Merrimack, N.H.; Ronald A. Sahatjian, Lexington, Mass.

[73] Assignee: Polaroid Corporation, Cambridge, Mass.

[21] Appl. No.: 601,579

[22] Filed: Apr. 18, 1984

Related U.S. Application Data

[62] Division of Ser. No. 238,054, Mar. 2, 1981, Pat. No. 4,446,305.

[51] Int. Cl.[3] ........................ B32B 9/04; C08G 69/32; G02B 5/30

[52] U.S. Cl. ................................ 428/212; 428/411.1; 428/913; 428/918; 428/910; 428/422; 428/426; 428/442; 428/475.2; 428/480; 428/481; 428/522; 428/702; 428/448; 350/403; 528/348; 264/176 R

[58] Field of Search ............... 428/918, 212, 913, 910, 428/411.1

[56] References Cited

U.S. PATENT DOCUMENTS

| | | | |
|---|---|---|---|
| 3,712,705 | 1/1973 | Mercatili | 350/96 WG |
| 4,446,305 | 5/1984 | Rogers et al. | 428/212 X |

*Primary Examiner*—Patricia C. Ives
*Attorney, Agent, or Firm*—Louis G. Xiarhos

[57] ABSTRACT

Optical devices including a molecularly oriented highly birefringent polymer are disclosed. The devices include molecularly oriented polymers comprising recurring units which exhibit a distribution of high electron density about the long axes of the polymer and the recurring units thereof. Transparent birefringent polymers comprising a plurality of recurring units having a substantially cylindrical distribution of electron density about the long axis of such units and the chain-extended polymers are included in optical devices and articles. The polymers exhibit high birefringence and simulate in a polymer the optical properties of a uniaxial crystal.

20 Claims, 9 Drawing Figures

OPTICAL DEVICE INCLUDING BIREFRINGENT POLYMER

This is a division of application Ser. No. 238,054, filed Mar. 2, 1981, and now U.S. Pat. No. 4,446,305, issued May 1, 1984.

BACKGROUND OF THE INVENTION

This invention relates to an optical device or article. More particularly, it relates to such an article or device including a molecularly oriented highly birefringent polymeric material.

Materials having a birefringent character have been variously applied in connection with the construction of filter and other optical devices. Frequently, a birefringent element utilized in an optical filter or other device will comprise a plate made from a monocrystalline form of birefringent material. Single crystals are expensive materials and are not readily formed to the desired shape or conformation required in particular applications. The size to which crystals can be grown represents an additional limitation on the utilization of such materials in optical devices.

Optical devices including a birefringent material in the form of a polymeric layer, such as may be formed by the unidirectional stretching of a suitable polymeric material, have also been described. Thus, light-polarizing devices utilizing a polymeric birefringent layer have been described in U.S. Pat. No. 3,213,753 (issued Oct. 26, 1965 to H. G. Rogers). Optical devices including polymeric birefringent materials have also been set forth, for example, in U.S. Pat. No. 3,506,333 (issued Apr. 14, 1970 to E. H. Land) and in U.S. Pat. No. 3,610,729 (issued Oct. 15, 1971 to H. G. Rogers). Frequently, the efficiency of an optical filter, polarizing or other optical device including a birefringent element or layer will depend upon the realization of large net differences in refractive index between a birefringent material and adjacent or contiguous layers. In general, such net differences will be maximized where a birefringent material is highly birefringent. Correspondingly, large net differences in refractive indices of contiguous layers will be unattainable where birefringent polymeric materials otherwise suited to application in an optical device tend to exhibit either low or only marginal birefringent character. Accordingly, optical devices including polymeric layers or elements exhibiting a highly birefringent character will be of particular interest for optical applications and enhanced efficiency.

SUMMARY OF THE INVENTION

The present invention provides an optical device or article which includes a molecularly oriented and optically uniaxial highly birefringent polymer. The polymer comprises repeating molecular units exhibiting high electron density substantially cylindrically distributed about the long axis of the polymer and the repeating units thereof. It has been found that the birefringent character of a polymer is importantly related to the molecular configuration or structure of the repeating units of the polymer and to the distribution of electron density about the long axis of the polymer and the repeating units thereof. Thus, it has been found that the provision, in a transparent polymeric material comprising a plurality of repeating units in chain-extended relationship, of a substantially cylindrical distribution of electron density about the long axis of the polymer permits the realization of high birefringence and the simulation in a polymeric material of optical properties of a uniaxial crystal.

The present invention, thus, provides an optical device or article including a transparent molecularly oriented highly birefringent polymer, said highly birefringent polymer comprising repeating molecular units exhibiting high electron density substantially cylindrically distributed about the long axes of the polymer and the repeating units thereof, said highly birefringent polymer being optically uniaxial exhibiting only two indices of refraction. It has been found that birefringence of a polymeric material useful in articles or devices of the present invention exhibit birefringence in relation to the molecular configuration of the repeating molecular units and the cylindrical or ellipsoidal electron density distribution about the axes of the polymer and the recurring units thereof, said birefringence being in relation to said molecular configuration and said electron density distribution according to a dimensionless geometric index G represented by the relationship $$G = 0.222 \times E \times \frac{L}{D}$$

wherein E is a dimensionless eccentricity factor defined by the relationship $$E = \frac{1 + e_L}{1 + e_T}$$

where $e_L$ is the longitudinal eccentricity of the polarizability of the repeating molecular unit and $e_T$ is the transverse eccentricity of the electron polarizability of the repeating molecular unit, L is the length of the repeating molecular unit along the main axis thereof and D is the mean diameter of the repeating molecular unit.

A preferred article of the present invention is a multilayer light-transmitting device including at least one additional transparent layer having an index of refraction substantially matching one index of refraction of said layer of transparent molecularly oriented highly birefringent polymeric material and comprising isotropic or birefringent material; said at least one additional transparent layer, when a layer of birefringent material, having one index of refraction thereof substantially different from one index of refraction of said layer of transparent molecularly oriented highly birefringent polymeric material and having a molecular orientation substantially perpendicular to the molecular orientation of said molecularly oriented highly birefringent polymeric material.

THE DRAWINGS

Figure 4B:
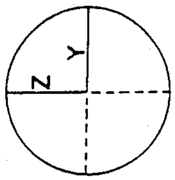
Figure 4A:
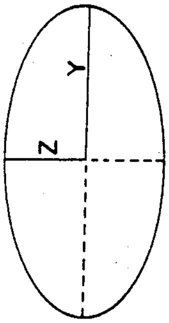

FIGS. 4*a* and 4*b* show, respectively, ellipsoidal and circular cross-sectional distribution of electron density about the long axis of a recurring unit of a polymeric material.

Figure 5:
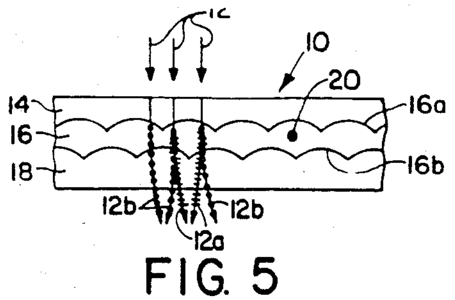

FIG. 5 is a diagrammatic fragmentary edge view of a light-transmitting device of the present invention illustrating the transmission of light rays therethrough.

Figure 6:
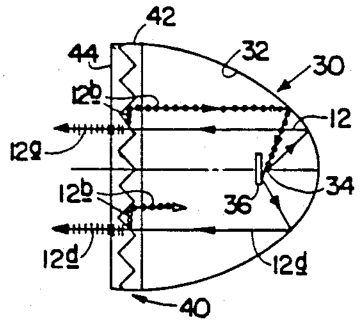

FIG. 6 is a diagrammatic side view of an automotive vehicle headlamp which includes a light-polarizing filter of the invention.

Figure 7:
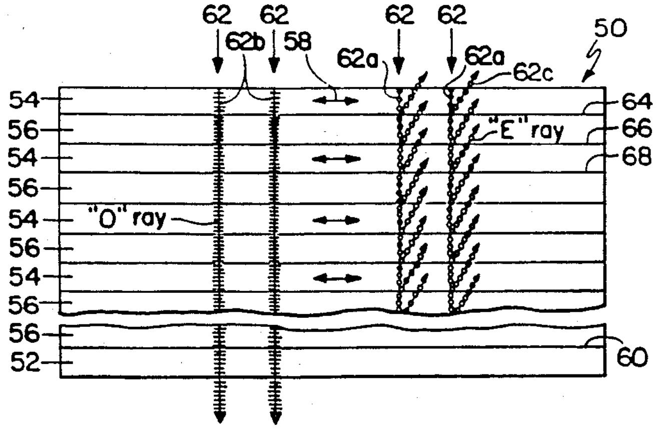

FIG. 7 is a diagrammatic fragmentary edge view of another embodiment of the present invention showing incident light thereon being partly transmitted and partly reflected as separate linearly polarized components vibrating in orthogonal directions.

Figure 8:
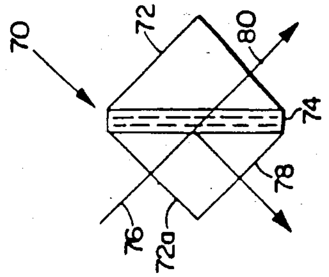

FIG. 8 is a diagrammatic side view of an optical beam-splitter device including a birefringent polymeric material.

DETAILED DESCRIPTION OF THE INVENTION

As indicated hereinbefore, the present invention provides an optical device including a transparent, molecularly oriented and highly birefringent polymeric material. The birefringent polymeric material of the devices of the invention comprises repeat molecular units which exhibit high electron density substantially cylindrically distributed about the long axes of the polymer and the repeat units thereof. The polymeric material, comprised of repeating units of molecular structure such as to provide a substantially cylindrical distribution of electron density about the long axis or backbone of the polymer, exhibits optical anistropy or birefringence in accordance with the relationship $$G = 0.222\left(\frac{1 + e_L}{1 + e_T}\right)\frac{L}{D}$$

where G represents the geometric index of a repeating unit; $e_L$ is the longitudinal eccentricity of the electron polarizability of the repeating molecular unit; $e_T$ is the transverse eccentricity; L is the length of the repeating unit along the main axis thereof; and D is the mean diameter of the repeating molecular unit. The contribution to birefringence of the molecular structure of a repeating, chain-extending unit and of electron density distribution will be better understood by reference to the drawings hereof.

Figure 2:
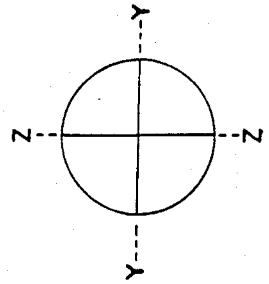
FIG. 2 is a cross-sectional view along the line 1—1 of FIG. 2.
Figure 1:
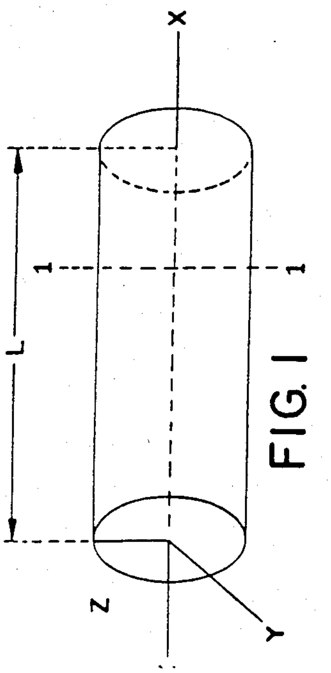
FIG. 1 is a geometric representation of molecular dimensions of a repeat unit of a polymeric material.

In FIG. 1 is shown a geometrical representation of a repeating chain-extending molecular unit of a polymeric material. Each repeating unit may thus be visualized as a repeating rod-like segment of finite length L and of a generally cylindrical configuration. Birefringence has been found to be importantly related to the molecular structure of the repeating units of the polymer in accordance with the relationship of geometric index G, set forth hereinbefore. A highly birefringent polymeric material useful in the optical devices hereof will thus comprise a plurality of molecular units in chain-extended relationship, each unit having a length L, shown in FIG. 1. The long axis X of each repeating unit forms, in the chain-extended polymer, the long axis or backbone. Each axis in FIG. 1 forms a right angle with respect to any other axis. The mean diameter D, set forth in the geometric index G, is determined for each repeating unit by the expression $D=(Y+Z)/2$. In FIG. 2 is shown along line 1—1 of FIG. 1, a cross-sectional view. The shown Y and Z axes are at right angles to one another, the X axis comprising the axis of the cylinder extending in a direction normal to the plane of the paper.

Figure 3:
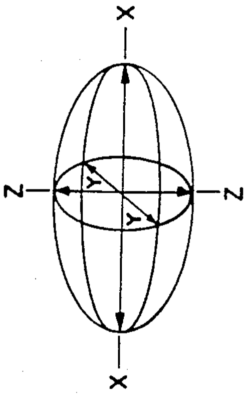
FIG. 3 is a vectorial representation of bond and group polarizabilities of a repeat unit of a polymeric material.

In addition to a rigid rod-like geometry in a polymeric material as the result of an end-to-end combination of repeating units, the electron density distributed around the long axis of the polymer, variously treated as a cylindrical or ellipsoidal distribution, is believed to comprise a major contributing factor to optical anisotropy or birefringence. High electron density substantially cylindrically distributed around the long axis of a polymer is exhibited, for example, in a polymer of coaxially-bonded repeating units comprising non-coplanar, particularly orthogonal, biphenyl groups. An orthogonal relationship between adjacent phenylene rings can be nearly attained by the placement of substituents with large steric effects on at least one ortho-position of each ring, relative to the inter-ring bond. In FIG. 3 is shown a vectorial representation of bond and group polarizabilities of a repeating unit of a polymer. It will be appreciated that electron density distribution about axis X will be variously treated as a cylindrical or ellipsoidal distribution depending upon the relative magnitudes of the Y and Z vectors. In FIG. 4*a* is shown an ellipsoidal cross-section along the axis of FIG. 3 where the magnitude of the shown Y vector is greater than that of the Z vector. Ideally, Y and Z vectors would be equal and the resulting circular cross-sectional distribution along the X axis is shown in FIG. 4*b*.

By a combination of longitudinal eccentricity ($e_L$) and transverse eccentricity ($e_T$), based upon bond and group polarizabilities, and the length and mean diameter of a repeating unit, a geometric index, G, related to optical anisotropy or birefringence, can be represented as follows:

$$G = 0.222\left(\frac{1 + e_L}{1 + e_T}\right)\frac{L}{D}$$

wherein $e_L$, $e_T$, L and D have the meanings hereinbefore ascribed. Longitudinal eccentricity $e_L$ may be represented according to the following relationship $$e_L = \frac{\sqrt{X^2 - \frac{(Y + Z^2)}{2}}}{X}$$

Transverse eccentricity $e_T$ may be represented by the relationship $$e_T = \frac{\sqrt{Y^2 - Z^2}}{Y}$$

wherein the magnitude of vector Y is the larger of the Y and Z vectors. Ideally, transverse eccentricity $e_T$ will equal zero and longitudinal eccentricity $e_L$ will equal one, in which case, eccentricity factor, E, will equal the theoretical maximum of two.

Geometric index G can be calculated for a variety of repeating units of a polymer material by resort to mean diameter and length values and longitudinal and transverse eccentricity values calculated from experimentally determined dihedral angles. It will be appreciated that the magnitude of values of length, mean diameter, longitudinal eccentricity and transverse eccentricity will materially influence the value of geometric index G. Thus, it will be appreciated that a repeating unit having, for example, a length of about twice that of a repeating unit having a different molecular structure and configuration will have a geometric index of about twice that of such different repeating unit. Accordingly, in making comparisons of geometric indices and magnitude thereof in relation to structural differences between comparative molecular repeating units, such differences in length should be borne in mind.

In general, experimentally determined values of birefringence for polymeric materials comprised of repeating units as aforedescribed will correlate directionally with values of geometric index, G, of the repeating units. Thus, in general, recurring units having higher geometric index values provide polymers exhibiting higher birefringence. Polymeric materials comprised of repeating units having a geometric index value, G, of about 0.5 or higher exhibit high birefringence and can be utilized in the optical devices of the present invention. It will be preferred, however, that polymeric materials comprising repeating units having geometric index values of one or higher be utilized herein. Especially preferred herein are polymers comprising repeating units of geometric index value of 1.2 or higher. Experimentally determined birefringence values for polymeric materials have been found to correlate with calculated geometric indices. For example, a geometric index of 1.20 was calculated for the recurring structural unit of the following polymer:

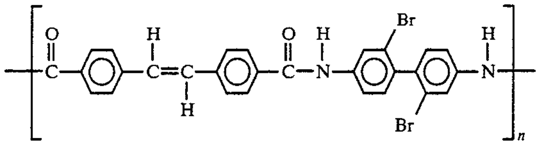

Theoretical maximum birefringence ($\Delta n_{max}$) was obtained by plotting the orientation function for the polymer (calculated from infrared dichroism) against the measured birefringence of the polymer and extrapolating to 100% orientation. A $\Delta n_{max}$ value of 1.20 was obtained. In like manner, a correlation of geometric index G of 1.18 and $\Delta n_{max}$ of 0.98 was obtained in connection with the following polymer comprising the shown recurring unit:

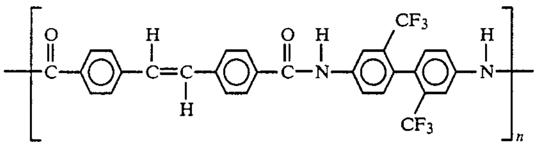

A number of polymeric materials comprising recurring units having a geometric index as hereinbefore defined of about 0.5 or higher can be suitably employed in oriented form as a birefringent polymeric material in an optical device of the present invention. Rigid rod-like polymeric materials comprised of recurring or repeating divalent units having interbonded p-phenylene moieties of non-coplanar molecular configuration are expecially suited herein and are generally characterized by geometric index values of one or greater and by high birefringence. Exemplary of recurring units of high geometric index G and high birefringence are certain polyamide materials including recurring units comprised, for example, of interbonded aromatic rings where the aromatic rings are in twisted relation to one another, i.e., where the aromatic rings are in a non-coplanar molecular configuration with respect to each other or, preferably, in mutually orthogonal planes. It has been found that the presence of substituent moieties on interbonded aromatic radicals, of type and position such as to effect a non-coplanar molecular configuration with respect to the interbonded aromatic radicals, provides a recurring unit having a high geometric index. The condition of non-coplanarity among aromatic rings in a recurring unit, or presence in such units of rings in "twisted" configuration relative to one another has been found to be importantly related to high birefringence in the rigid rod-like oriented polymers resulting from the end-to-end joining of such recurring units.

Among polyamide materials suited to application as highly birefringent layers in the devices of the invention are polyamides comprising repeating units of the formula

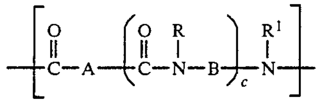

wherein each of A and B is a divalent radical, except that B can additionally represent a single bond; R and $R^1$ are each hydrogen, alkyl (e.g., methyl, ethyl), aryl (e.g., phenyl, naphthyl), alkaryl (e.g., tolyl), aralkyl (e.g., benzyl); c is zero or one; and wherein, when c is one, at least one of A and B is a divalent radical selected from the group consisting of:

(1) a divalent substituted biphenyl radical

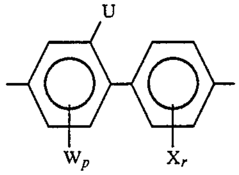

where U is a substituent other than hydrogen, each W is hydrogen or a substituent other than hydrogen, p is an integer from 1 to 3, each X is hydrogen or a substituent other than hydrogen and r is an integer from 1 to 4, said U, Wp and Xr substitution being sufficient to provide said radical with a non-coplanar molecular configuration; and (2) a divalent substituted stilbene radical

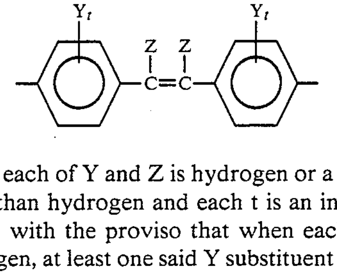

where each of Y and Z is hydrogen or a substituent other than hydrogen and each t is an integer from 1 to 4, with the proviso that when each said Z is hydrogen, at least one said Y substituent is a substituent other than hydrogen positioned on the corresponding nucleus ortho with respect to the

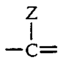

moiety of said radical, said Z and $Y_t$ substitution being sufficient to provide said radical with a non-coplanar molecular configuration;

and wherein, when c is zero, A is a divalent radical selected from the group consisting of radicals (1) and (2) as hereinbefore defined.

As used herein, substitution sufficient to provide a radical with a non-coplanar molecular configuration refers to substitution of type and position effective to confer to the interbonded aromatic radical thereof a non-coplanar molecular configuration such that the value of the geometric index, as hereinbefore defined, is about 0.5 or higher. Preferably, the nature of such substitution will be sufficient to provide a G value of 1.0 or higher, and most preferably, 1.2 or higher.

As described hereinbefore, birefringent polyamides useful in devices of the present invention include those comprising recurring units of the formula Formula I

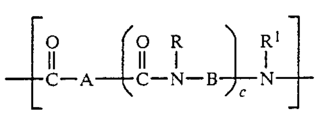

wherein c is zero or one and wherein A (when c is zero) or at least one of A and B (when c is one) comprises a substituted divalent biphenyl radical or a substituted divalent stilbene radical. Thus, when c is zero, divalent radical A comprises a substituted biphenylene radical having a non-coplanar molecular configuration or a substituted divalent stilbene radical of non-coplanar molecular configuration. Similarly, when c is the integer one, one or both of divalent radicals A and B comprises such substituted biphenylene or substituted stilbene radicals. It is preferred from the standpoint of ease of preparation that each of R and $R^1$ be hydrogen, although each of R and $R^1$ can be alkyl, aryl, alkaryl or aralkyl.

From inspection of the general formula set forth as descriptive of recurring units of the polyamides of Formula I, it will be appreciated that polyamides comprising the following recurring units are contemplated when c is one:

Formula II

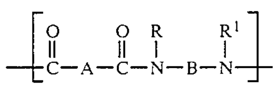

In such recurring units, at least one of divalent radicals A and B will comprise a substituted biphenylene or substituted stilbene radical of non-coplanar, molecular configuration conforming to the formulae Formula III

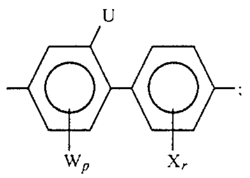

or

-continued

Formula IV

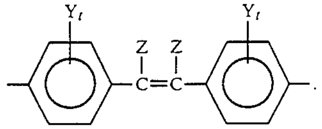

Where only one of said A and B radicals is a substituted biphenylene or substituted stilbene radical conforming to the radicals represented by the structures of Formulas III and IV, the remaining A or B radical can comprise any of a variety of divalent radicals so long as the birefringent properties of the polyamide material are not effectively negated. In general, where only one of the A and B radicals conforms to the structures represented by Formulas III and IV, the remaining A or B radical will desirably be a divalent radical which does not confer transverse eccentricity to the recurring unit. Similarly, where one of radicals A or B is a radical which confers transverse eccentricity to the recurring unit, the other of radical A or B will desirably be a radical which confers high longitudinal eccentricity such that the recurring unit of the polymer exhibits a high geometric index. Suitable divalent radicals include, for example, unsubstituted biphenylene or stilbene radicals; phenylene; trans-vinylene; or ethynylene. Also suitable are polyunsaturated divalent radicals conforming to the formula

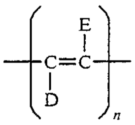

where n is an integer of at least two (e.g., two or three) and each of D and E is hydrogen or alkyl (e.g., methyl) and inclusive of such polyunsaturated divalent radicals as trans-trans-1,4-butadienylene, i.e.,

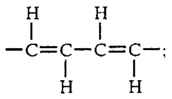

and 1,4-dimethyl-trans-trans-1,4-butadienylene, i.e.,

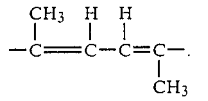

It will be appreciated that compounds containing amino groups directly attached to carbon atoms having linear unsaturated radicals are not stable and that, accordingly, the aforesaid vinylene, ethynylene and butadienylene radicals cannot serve as B radicals in the recurring units represented by the structure of Formula II.

In general, from the standpoint of maximized birefringent properties, it will be preferred that each of radicals A and B comprise a divalent radical exhibiting a non-coplanar molecular configuration and conforming to the structures of Formulas III or IV. It will be appreciated, however, that the particular nature of such A and B radicals may affect the ability to readily orient the polyamide material, as by extrusion, stretching or the like. Accordingly, where the ability of a polyamide material to be oriented is effectively reduced by the presence in the polyamide of each of radicals A and B of non-coplanar molecular configuration and conforming to the structures of Formulas III or IV, it will be preferred that only one of such radicals A and B of the polyamide material conform to the structure of Formulas III or IV.

In the case of radicals A and/or B of the recurring type represented by Formula III, U will comprise a substituent other than hydrogen; W will be either hydrogen or a substituent other than hydrogen; and p will be an integer of from 1 to 3. In the case of such radicals, X will be hydrogen or a substituent other than hydrogen and r will be an integer of from 1 to 4. It will be appreciated from the nature of U, W, p, X and r, as set forth, that at least one aromatic nucleus of the biphenylene radical represented by Formula III will be substituted by a moiety other than hydrogen and that such substituent, U, will be positioned in an ortho relationship to the bridging carbon atoms of the biphenylene nuclei. Preferably, each aromatic nucleus of the biphenylene radical of Formula III will contain a substituent other than hydrogen positioned in an ortho relationship to the bridging carbon atoms of the biphenylene radical of Formula III and in this case, the divalent radical will have the following formula Formula V

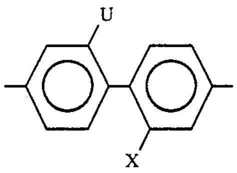

wherein each of U and X comprises a substitutent other than hydrogen.

The nature and positioning of substituents U, W and X of the biphenylene radical of Formula III can vary widely, consistent with the provision of a biphenylene radical having a non-coplanar molecular configuration. While applicants do not wish to be bound by precise theory or mechanism in explanation of the highly birefringent character observed in oriented polymers comprising recurring units of high geometric index, it is believed that the non-coplanar character conferred or promoted by the presence in a polymer of such recurring units provides a distribution of high electron density cylindrically about the long axis of the polymer. This distribution is believed to be importantly related to unusually high birefringence observed in such polymers.

The nature of substituency, U, Wp and Xr should be such as to provide the biphenylene radical of formula III with a non-coplanar molecular configuration referred to hereinbefore. Such configuration will in part be determined by the positioning and size of non-hydrogen substituents on the aromatic nuclei of the biphenylene radical and upon the number of such substituents on such aromatic nuclei. For example, where the biphenylene radical contains a single non-hydrogen substituent, i.e., substituent U, the nature and, in particular the size of such U substituent, should be such as to provide the desired non-coplanar molecular configuration. Suitable U substituents herein include halogen (e.g., fluoro, chloro, bromo, iodo); nitro; alkyl (e.g., methyl, ethyl); alkoxy (e.g., methoxy); substituted-alkyl (e.g., trifluoromethyl or hydroxymethyl); cyano; hydroxy; thioalkyl (e.g., thiomethyl); carboxy; sulfonic acid esters; sulfinic acid esters; carboxyamide; sulfonamide; amino; and carbonyl. Substituent X can comprise hydrogen or any of the substituents set forth in connection with substituent U. Preferably, at least one X substituent will comprise a substituent other than hydrogen. Each substituent W can comprise hydrogen or a substituent other than hydrogen as set forth in connection with substituents U and X. Normally, W will be hydrogen and p will be the integer 3.

Preferred polyamides herein are the polyamides comprising recurring units having the biphenylene radical of Formula V, i.e., Formula V

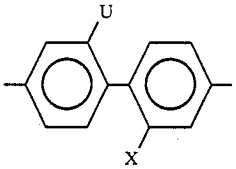

wherein each of U and X is a substituent other than hydrogen. The presence of such non-hydrogen substituents on each of the aromatic nuclei of the radical promotes a condition of non-coplanarity. Examples of such preferred substituents, which may be the same or different, include halo, nitro, alkoxy and substituted-alkyl (e.g., trifluoromethyl). While the presence of such non-hydrogen substituents is preferred from the standpoint of promoting non-coplanarity, it will be appreciated from the nature of substituents W and X set forth in connection with Formula III hereinbefore, that each X and W can be hydrogen and that, accordingly, substituent U will in such instance desirably comprise a bulky substituent such as will provide steric hindrance to a condition of coplanarity.

In the polyamides of the present invention which comprise recurring units represented by the following formula Formula II

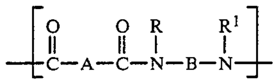

either or both of radicals A and B can comprise the substituted stilbene radical set forth hereinbefore as Formula IV, i.e., Formula IV

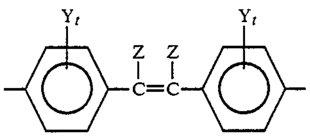

In such stilbene radicals, the nature of each Y and Z will be such as to provide the radical with a non-coplanar molecular configuration. Preferably, non-coplanarity will be provided by the presence of a single non-hydrogen substituent Z. Where each Z is hydrogen, non-coplanarity can be provided by the positioning of a non-hydrogen Y substituent on at least one aromatic nucleus of the radical in an ortho relationship to the

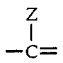

moiety of the radical. Suitable non-hydrogen Y and Z substituents include, for example, any of those set forth in connection with radicals U, W and X defined hereinbefore.

Examples of preferred stilbene-type radicals included within the class represented by Formula IV include the following:

Formula VI

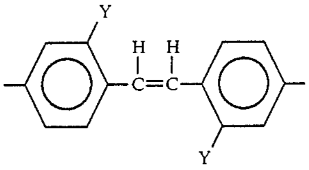

where at least one of the Y substituents is other than hydrogen, preferably, halo or alkoxy; and Formula VII

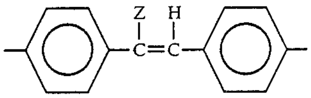

where Z is a substituent other than hydrogen, preferably halo.

Inclusive of polyamides of the present invention represented by the structure of Formula II are those having recurring units represented by the following structures wherein, unless otherwise specified, U, W, p, X, r, Y and t have the meanings set forth hereinbefore:

Formula VIII

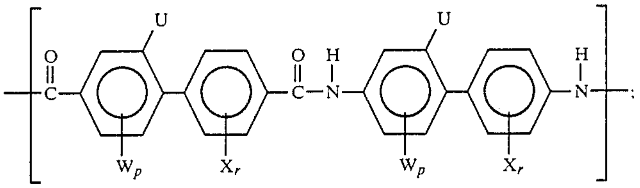

Formula IX

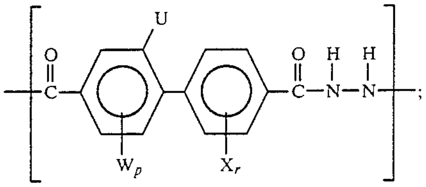

Formula X

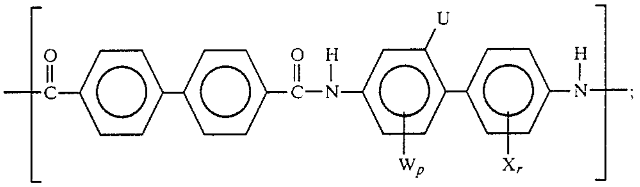

Formula XI

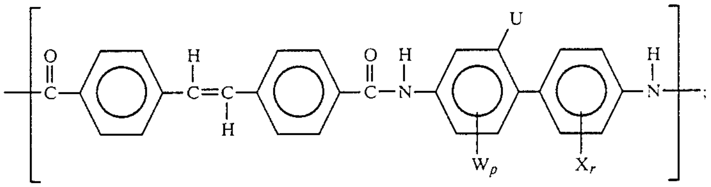

Formula XII

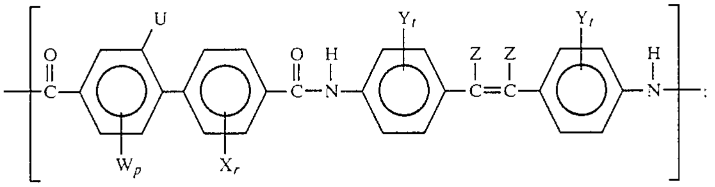

-continued

Formula XIII

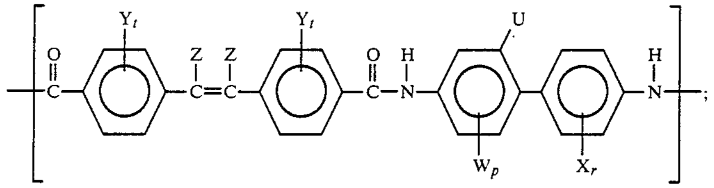

Formula XIV

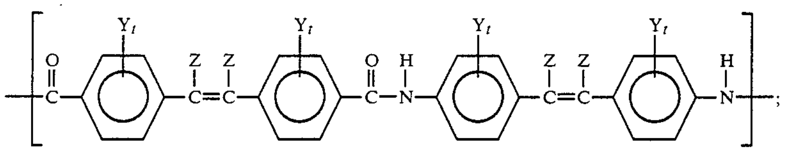

Formula XV

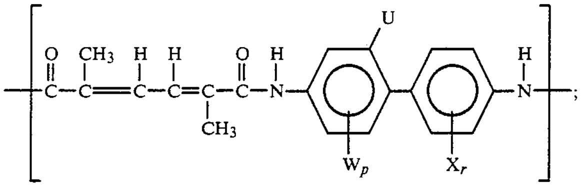

Formula XVI

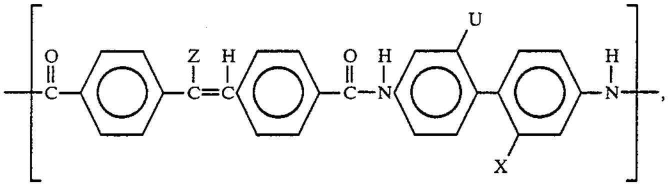

where Z and X are other than hydrogen; and

Formula XVII

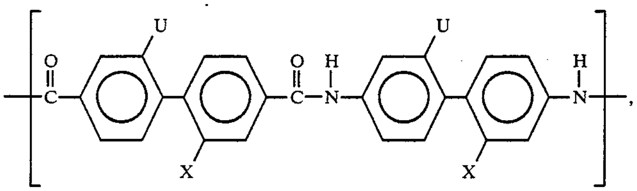

where each X is other than hydrogen.

From inspection of the general formula set forth as descriptive of recurring units of the polyamides, i.e., recurring units of the formula Formula I

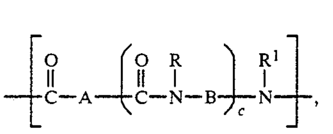

it will be appreciated that, when c is zero, the recurring units will be represented by the following formula:

Formula XVIII

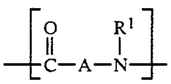

In such recurring units, radical A will comprise a divalent radical having a non-coplanar molecular configuration and conforming to the structures of Formulas III and IV set forth hereinbefore, i.e., Formula III

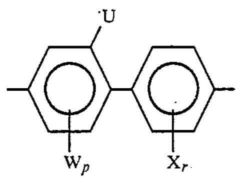

or

Formula IV

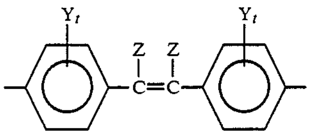

where U, W, p, X, r, Y, t and Z have the same meanings.

Inclusive of polyamides represented by the structure of Formula XVIII are those having recurring units represented by the following structures wherein U, W, p, X, r, Y and t, unless otherwise indicated, have the meanings set forth hereinbefore:

Formula XIX

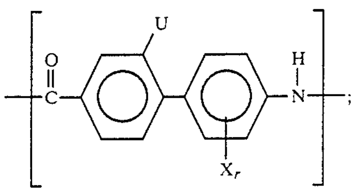

Formula XX

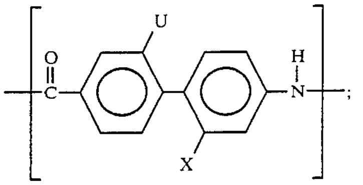

where X is other than hydrogen;

Formula XXI

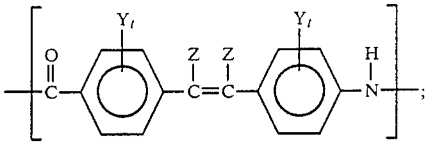

Formula XXII

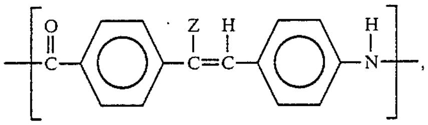

where Z is other than hydrogen.

While the polyamides described herein consist essentially of recurring units represented by the structures of Formulas II and XVIII, i.e., recurring units of the formulas

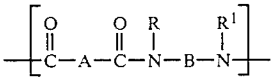 or 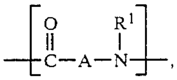, or a combination of such recurring units, the polyamides can also comprise recurring units not conforming to the described structures of Formulas II and XVIII. Examples of recurring units which do not conform to such descriptions and which can be present in such polyamides in proportions which do not negate the high birefringence of the polymeric material include, for example, recurring units having the formulas

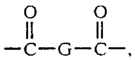,

Formula XXIII

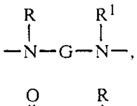, or

Formula XXIV

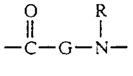

Formula XXV wherein G is a divalent radical such as 1,4-phenylene; 4,4'-biphenylene; vinylene; trans,trans-1,4-butadienylene; 4,4'-stilbene; ethynylene; 1,5-naphthalene; 1,4-dimethyl-trans,trans-1,4-butadienylene; 2,4'-trans-vinylenephenylene; trans,trans-4,4'-bicyclohexylene; 2,5,7-bicyclooctatriene-1,4-, i.e.,

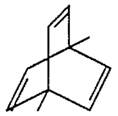 ; or 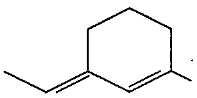.

Other divalent radicals can, however, serve as radical G provided that such radicals do not adversely and materially reduce the birefringence of the polyamide material. It will be appreciated that G cannot represent an aliphatic unsaturated moiety where a carbon atom thereof having such unsaturation is to be bonded to an amino group.

The substituted polyamides utilized in devices of the present invention can be prepared by resort to polyamide synthesis routes involving the polymerization of suitable acid halide and amine monomers in an organic solvent which may contain a solubilizing agent such as lithium chloride or chain-terminating agent where desired. Polyamides of the type represented by the structure of Formula I can be prepared, for example, by the reaction of a dicarboxylic acid halide of the formula

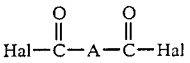

with a diamine of the formula

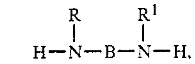, where Hal represents halogen, such as chloro or bromo and A and B have the meanings hereinbefore set forth, except that B cannot represent an aliphatic unsaturated moiety. The reaction can be conducted in an organic solvent such as N-methyl pyrrolidone (NMP), tetramethylurea (TMU) of a mixture thereof, and preferably, in the presence of a salt such as lithium chloride to assist in the solubilization of reactant monomers and maintenance of a fluid reaction mixture. The preparation of a polyamide of the present invention can be illustrated by reference to the preparation of poly(2,2'-dibromo-4,4'-biphenylene)-trans-α-bromo-p,p'stilbene dicarboxamide, a preferred polyamide herein, in accordance with the following reaction scheme:

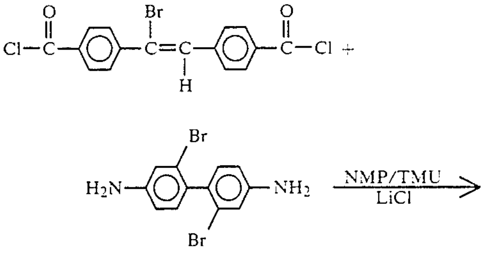

-continued

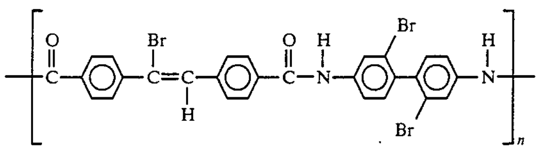

Polyamides containing recurring units having the structure represented by Formula XIII, i.e.,

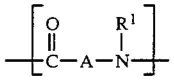

can be prepared, for example, by the polymerization of a p-amino-aroyl halide monomer in the form of a halide, arylsulfonate, alkylsulfonate, acid sulfonate, sulfate or other salt. This polymerization can be illustrated by reference to the preparation of poly(2,2'-dibromo-4,4'-biphenylene)carboxamide in accordance with the following reaction scheme showing the polymerization of the hydrochloride salt of 2,2'-dibromo-4-amino-4'-chlorocarbonylbiphenyl:

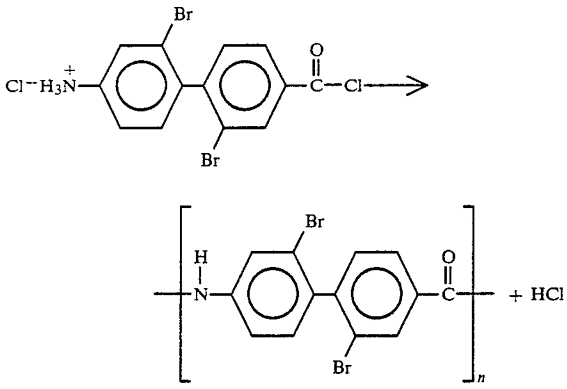

Substituted polyamides useful in optical devices of the present invention can be prepared by polymerization of correspondingly substituted monomers in a suitable organic reaction solvent. Such solvents include amide and urea solvents including N-methyl-pyrrolidone and N,N,N'N'-tetramethylurea. Other suitable reaction solvent materials include N-methylpiperidone-2; N,N-dimethylpropionamide; N-methylcaprolactam; N,N-dimethylacetamide; hexamethylphosphoramide; and N,N'-dimethylethylene urea. The polymerization can be conducted by dissolving the monomer or monomers to be polymerized in the reaction solvent and allowing the exothermic polymerization reaction to occur usually with the aid of external cooling. In general, the polymerization will be conducted initially at a temperature of from about −20° C. to about 15° C., and preferably, in the range of from about −5° C. to about 5° C. Thereafter, usually within about one-half hour to one hour, the reaction will be heated with formation of a thickened polymeric mass of gel-like consistency. In general, the polymerization reaction will be conducted over a period of from about 1 to 24 hours, preferably about 3 to 18 hours.

While the monomer or monomers to be polymerized can be dissolved in a suitable amide or urea solvent and allowed to react with formation of the desired polymeric material, a preferred reaction sequence where a mixture of copolymerizable monomers is utilized involves the preparation of a solution of a first monomer in the amide or urea solvent and the addition thereto of a second or other monomer or a solution thereof in a suitable organic solvent therefor, such as tetrahydrofuran. External cooling of the resulting reaction mixture provides the desired polyamide material in high molecular weight and minimizes the production of undesired side reactions or by-products.

The polyamide materials prepared as described can be recovered by combining the polymerization reaction mixture with a non-solvent for the polymer and separating the polymer, as by filtration. This can be effectively accomplished by blending the polymerization mixture with water and filtering the solid polyamide material. The polyamide can be washed with an organic solvent such as acetone or ether and dried, for example, in a vacuum oven.

Polyamide materials as described hereinbefore and methods for their preparation are described in greater detail in the patent application of H. G. Rogers, R. A. Gaudiana, J. S. Manello and R. A. Sahatjian, U.S. Ser. No. 238,069, filed Mar. 2, 1981, and now U.S. Pat. No. 4,384,107, issued May 17, 1983.

While the transparent highly birefringent materials useful in the devices of the present invention have been set forth by reference to certain polyamides, represented by the structures of Formulas II and XVIII, it will be appreciated that transparent highly birefringent polymeric materials of other polyamide types, or of types or classes other than polyamides, can likewise be utilized herein where the repeating units of such polymers have a substantially cylindrical distribution of electron density about the long axis of the polymer.

Particularly useful herein are transparent polyamide materials comprising recurring units corresponding to Formula I hereof wherein c is zero or one, each of A and B is a divalent radical, except that B can additionally represent a single bond, and at least one of A and B is a substituted-quaterphenylene radical having the formula

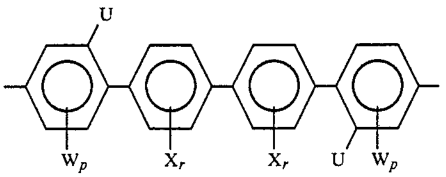

wherein U, W, X, p and r have the meanings set forth herein and the U, $W_p$ and $X_r$ substitution is sufficient to provide the radical with a non-coplanar molecular configuration.

The above substituted-quaterphenylene polyamides can be prepared, for example, by reaction of a suitably substituted quaterphenylene diamine and a dicarboxylic acid or halide. These polymers and their preparation are described in greater detail and are claimed in the patent application of R. A. Gaudiana and P. S. Kalyanaraman, U.S. Ser. No. 239,180, filed Mar. 2, 1981, and now U.S. Pat. No. 4,393,194, issued July 12, 1983.

Transparent polymeric materials from classes other than polyamides and which can be utilized herein include, for example, polymers having thiazole, imidazole, oxazole and/or ester linkages. For example, polymeric materials comprising the following thiazole-containing recurring units, where U, W, X, p and r have the meanings hereinbefore ascribed, can be utilized herein:

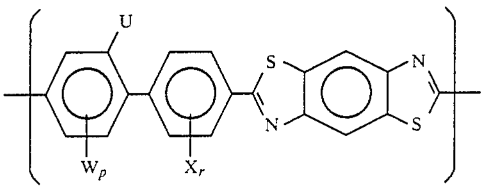

Such polymeric materials can be prepared by reaction of a dicarboxylic acid compound of the formula

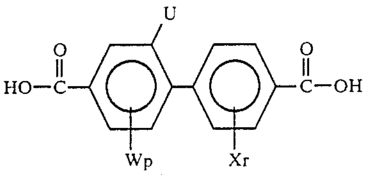

with an amino-thiol of the formula

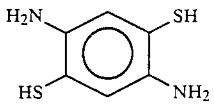

in a suitable organic solvent with recovery of the desired polymeric material.

Polymers comprising the following imidazole-containing repeating units can also be employed herein, where U, W, X, p and r have the meanings hereinbefore described.

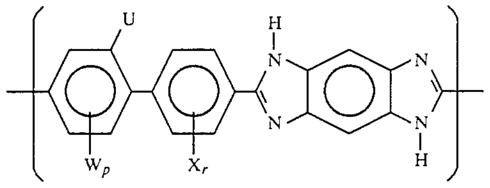

These polymers can be prepared, for example, by reaction of a dicarboxylic acid compound of the formula

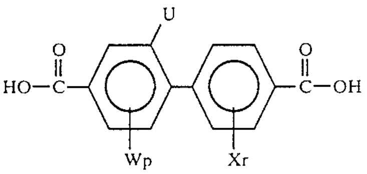

with 1,2,4,5-tetramino-benzene.

Polymers containing recurring units having an oxazole moiety can be suitably prepared by reaction of a dicarboxylic acid compound as aforedescribed with, for example, 1,4-dihydroxy-2,5-diamino-benzene, with formation of a polymer containing the following recurring units where U, W, X, p and r have the meaning set forth hereinbefore.

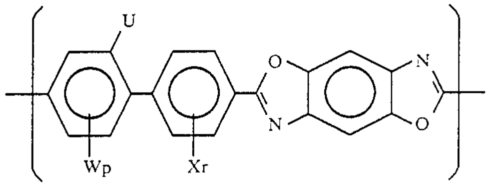

Polyester materials can also be suitably employed herein. Exemplary of such polyesters are those having recurring units of the formula

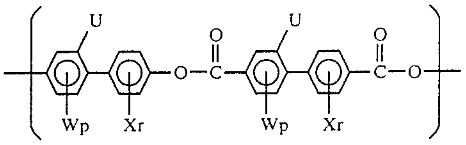

wherein each U, W, X, p and r has the meaning set forth hereinbefore.

Other polymers that can be utilized in optical devices of the present invention are polymers comprising recurring units of the formula

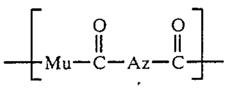

where Mu is a divalent radical having the formula

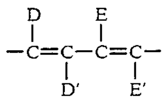

where each of D, D', E and E' is hydrogen, alkyl or substituted-alkyl; and Az is a divalent radical having the formula

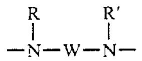

where each of R and R' is hydrogen, alkyl, aryl, alkaryl or aralkyl and W is a single bond, alkylene or alkenylene; or Az is a divalent radical having the formula

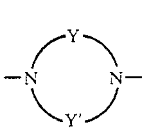

where each of Y and Y' represent the atoms necessary to complete with the nitrogen atoms to which they are bonded a piperazine or substituted-piperazine radical.

These polymers can be conveniently prepared by reaction of a dienoic acid chloride such as mucononic acid chloride or α,α'-dimethylmuconic acid chloride with hydrazine or a diamine such as piperazine, 2-methylpiperazine or 2,5-dimethylpiperazine. Suitable polymers of this type and methods for their preparation are described in the patent application of H. G. Rogers, R. A. Gaudiana, J. S. Manello and R. A. Sahatjian, U.S.

Ser. No. 238,057, filed Mar. 2, 1981, and now U.S. Pat. No. 4,393,196, issued July 12, 1983.

The polymeric materials utilized in the devices of the present invention can be variously formed or shaped into films, sheets, coatings, layers, fibrils, fibers or the like. For example, a solution of a substituted polyamide as described hereinbefore, in a solvent material such as N,N-dimethylacetamide, optionally containing lithium chloride solubilizing agent, can be readily cast onto a suitable support material for the formation of a polymeric film or layer of the polyamide material. The polymeric film can be utilized for the production of a birefringent polymeric film or sheet material which can be utilized in an optical device of the invention. Thus, a polymeric film or sheet material can be subjected to stretching so as to introduce molecular orientation and provide a film material having a highly birefringent character.

Known shaping or forming methods can be utilized for the orientation of polymeric materials suited to application in devices of the present invention. Preferably, this will be accomplished by unidirectional stretching of a polymeric film, by extrusion of the polymer into a sheet, layer or other stretched form, or by the combined effects of extrusion and stretching. In their oriented state, the polymers utilized herein exhibit unusually high birefringence. In general, greater birefringence will be observed in the case of polymeric materials exhibiting a greater degree of molecular orientation. It will be appreciated, however, as has been pointed out hereinbefore, that the particular molecular structure or configuration of the polymeric material may affect desired physical attributes of the polymer material or otherwise impose a practical limitation upon the degree of orientation that can be realized by stretching or other means. It is a significant aspect of the present invention, however, that the polymeric birefringent materials utilized in the devices of the present invention, particularly for a given degree of orientation, exhibit unusually high birefringence. In this connection, it is to be noted, for example, that the substituted polyamides described herein will often exhibit higher birefringence than the more highly oriented materials of different polymeric structure. For example, an extruded film of a substituted polyamide hereof comprised of recurring units of the formula

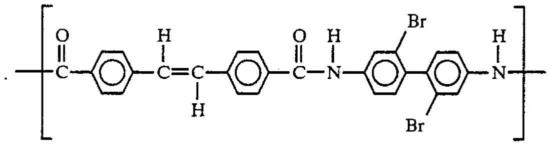

and having a degree of orientation in the range of from about 80% to 85% as determined from infra-red dichroism, exhibited a birefringence (Δn) of 0.865 as measured utilizing principles of interferometry. In contrast, a polyamide fiber material and comprised of recurring units of the formula:

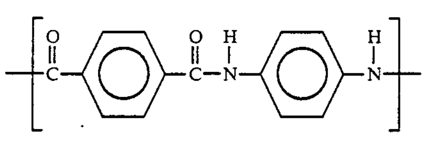

is reported in the literature, A. A. Hamza and J. Sikorski, J. Microscopy, 113, 15 (1978), as having a birefringence of 0.761, as measured by interferometric technique and at a degree of orientation of about 90% to 95%.

The birefringent polymers useful in the devices hereof will desirably simulate to the maximum practical extent the optical properties of a uniaxial crystal. Accordingly, the birefringent polymers will exhibit substantially uniaxial optical behavior, i.e., only two indices of refraction. Optical efficiency and maximum birefringence will be realized where such substantially uniaxial behavior is exhibited by such polymers.

The molecularly oriented birefringent polymers utilized herein will preferably exhibit a birefringence of at least about 0.2, and more desirably, a birefringence of at least 0.4. Thus, preferred polymers for use in the articles hereof will exhibit substantially uniaxial optical behavior and a birefringence of at least about 0.2 and will be comprised or recurring units having a geometric index of about 0.5 or higher.

The birefringent polymeric materials utilized in the devices of the present invention, in addition to exhibiting high birefringent properties, are advantageous from the standpoint of their transparency. In contrast to polymeric materials which become decidedly opaque as a result of stretching, birefringent materials hereof exhibit transparency in unoriented and stretched forms. For example, the substituted polyamides described herein exhibit a high transparency and a low order of light scattering, exhibiting a ratio of amorphous to crystalline material of from about 10:1 to about 20:1 by weight. These materials are, thus, suited to optical applications where a light-transmissive, highly refractive and birefringent material is desirably utilized. Depending upon the nature of substituent moieties on the divalent radicals of the recurring units of these polyamides, colorless or nearly colorless polymeric films or layers can be fabricated. Where, for example, nitro-substituted biphenylene radicals are present, a yellow transparent film or fiber can be fabricated. Films, coated or other shaped forms of the substituted polyamides can be redissolved and reshaped or refabricated if desired. Depending upon the nature of particular recurring units of the polyamide materials, and particularly the nature of substituent moieties and solvent materials, the solubility characteristics of these substituted polyamides can be varied or controlled to suit particular applications.

The birefringent properties of polymers utilized in the devices of the present invention can be determined by the measurement of physical and optical parameters in accordance with known principles of physics and optics. Thus, for example, the birefringence (Δn) of a suitable birefringent polymeric material can be determined by the measurement of optical phase retardation (R) and film thickness (d) and calculation of birefringence in accordance with the relationship $$\Delta n = \frac{R\lambda}{d}$$

where λ represents the wavelength of light utilized for the conduct of the measurements. Alternatively, parallel refractive index and perpendicular refractive index of the film material can be measured utilizing Becke line analysis or critical angle measurement.

A preferred method for determining the birefringence of useful polymeric materials involves the measurement of retardation of the polymeric material by a method utilizing principles of polarized-light microscopy and interferometry. Such method provides desired precision and accuracy in the measurement of the phase difference between a sample ray passing through a sample of polymeric material and a reference ray passing through a neighboring empty area (embedding medium or air) of the same thickness. The light emitted by a low-voltage lamp of a microscope is linearly polarized by passage through a polarizer and, in turn, is passed through a condenser, a calcite plate beam splitter, a half-wave retarder plate, the polymeric sample, a beam recombinator calcite plate, and through an analyzer whose transmission direction is vertical to that of the polarizer (crossed position). In the analyzer the components vibrating in its absorption direction are extinguished, whereas the components of both rays in the transmission direction are transmitted and interfere. The phase difference between sample and reference beams, caused by the molecular structure or configuration of the polymeric sample, is measured with compensators. From these measurements, the thickness and refractive index of the polymeric material can be determined. By determining index of refraction of the polymeric sample for both parallel and perpendicular directions, birefringence can, by difference, be determined. A suitable method and apparatus for determining phase retardation, index of refraction and birefringeance for the polymeric materials utilized herein is a pol-interference device according to Jamin-Lebedeff described in greater detail by W. J. Patzelt, "Polarized-light Microscopy," Ernest Leitz GmbH, Wetzlar, West Germany, 1974, page 92.

Preferred optical devices of the present invention are multilayer devices which include a layer of molecularly oriented and highly birefringent polymeric material as described hereinbefore, and in addition, at least one layer of isotropic or birefringent material. The additional layer or layers, whether isotropic or birefringent, comprises a material having an index of refraction matching substantially one index of refraction of the highly birefringent material. For example, a layer of isotropic material having an index of refraction matching substantially one index of refraction of the highly birefringent layer can be suitably bonded to the layer of highly birefringent polymer. A preferred device comprises a layer of the molecularly oriented and highly birefringent material bonded between two layers of isotropic material, the index of refraction of each isotropic layer constituting substantially a match with an index of refraction of the molecularly oriented and highly birefringent material. Such a preferred device can be utilized for the polarization of light and may be termed a "total transmission" light polarizer, i.e., one which is particularly adapted to polarize a very large portion of incident light. Total polarizers find application in equipment such as may be employed for signaling, projection and display purposes, or the like, and in anti-glare systems for automotive vehicles.

According to another embodiment of the present invention, a molecularly oriented and highly birefringent material as defined herein can be suitably bonded to an additional layer of birefringent material. In such an embodiment, one index of refraction of the molecularly oriented and highly birefringent material will match substantially one index of refraction of the additional birefringent material. Similarly, the second index of refraction of the molecularly oriented and highly birefringent material will be substantially a mismatch with respect to the second index of refraction of the additional birefringent material. Where a layer of molecularly oriented and highly birefringent material is bonded to an additional layer of birefringent material, the direction of orientation of each contiguous birefringent material will be substantially perpendicular with respect to the other.

According to another embodiment of the present invention, a plurality of alternating isotropic and birefringent layers can be utilized for the production of a multilayer light polarizing device, at least one of the layers of birefringent material comprising a molecularly oriented and highly birefringent material as defined herein. Such a device can be utilized as a multilayer polarizer which partly transmits and partly reflects incident light as separate linearly polarized components vibrating in orthogonal directions.

In FIG. 5 is shown, in considerably exaggerated dimensions, an optical device of the present invention in the form of light-polarizing sheet material 10 as it would appear in cross-section, namely, as viewed along a given edge. In order of arrangement with respect to the direction of a collimated beam 12 from a light source (not shown) the material is composed of an isotropic, or at least functionally isotropic layer 14 having a relatively low refractive index, a molecularly oriented highly birefringent polymeric layer 16 and a functionally isotropic layer 18 having a relatively high refractive index, the layers preferably being laminated or bonded together to form a unitary structure. It is not essential to the proper functioning of the device that the layers thereof be bonded together, provided, however, that adjacent or contiguous layers enclosing an air layer are maintained parallel to one another. One refractive index of the polymeric molecularly oriented and highly birefringent layer 16 matches substantially that of layer 14 while the other refractive index thereof matches substantially the index of refraction of layer 18. For purposes of illustration, the aforesaid refractive indices may be taken as follows: the refractive index of layer 14 is 1.50; the two indices of layer 16 are 2.00 and 1.50; and the index of layer 18 is 2.00.

The interface between layers 14 and 16 is composed of a plurality of lens-like or lenticular elements 16*a* and the interface between layers 16 and 18 is composed of a plurality of lens-like or lenticular elements 16*b*. It will be noted that the lenticules of one interface are offset, laterally, with respect to those of the other. The term "lenticular", as employed herein, may broadly be interpreted as constituting a plurality of surface configurations, including prismatic elements, as well as those of a strictly lens-like form. A certain degree of latitude is possible as to the choice of materials employed in forming the several layers. Thus, for example, layer 14 may suitable be composed of an isotropic plastic material such as poly(methylmethacrylate) having a refractive index of 1.50. Layer 16 can, accordingly, be composed of a transparent plastic layer which, for example, has been rendered birefringent as by unidirectional stretching. Suitable for this purpose is the polymeric material, poly[2,2′-bis(trifluoromethyl)-4,4′-biphenylene]2″,2‴-dimethoxy-4,4‴-biphenyldicarboxamide having refractive indices of 1.50 and 2.00 when thus rendered birefringent. Layer 18 can be suitably comprised of or incorporate a transparent isotropic material having an index of refraction approximating the higher index of birefringent layer 16.

One such material is poly(2,2'-dibromo-4,4'-biphenylene)-4,"4'''-stilbenedicarboxamide having an index of refraction of 2.07. Alternatively, layer 18 can comprise poly(2,2'-dibromo-4,4'-biphenylene)-α-bromo-4",4'''-stilbenedicarboxamide having a refractive index of 2.05.

One method of constructing the sheet material is to form the birefringent layer 16 by a casting, or a casting and embossing procedure, after its proper solidification, and casting the isotropic layers 14 and 18 on the opposite lenticular surfaces thereof. The birefringent layer 16 may be composed of substantially any material having a birefringence adapted to facilitate the required separation of light ray components and having indices of refraction which bear a proper relation to those of the contiguous layers 14 and 18. It may also be formed by any of several different procedures. Assuming, by way of illustration, that the birefringence of layer 16 is to be achieved through its molecular orientation, a sheet or film of properly deformable material, such as the aforementioned material, poly[2,2'-bis(trifluoromethyl)-4,4'-biphenylene]-2",2'''-dimethoxy-4",4"-biphenyldicarboxamide, i.e., a sheet of a given length and predetermined thickness, can be first extruded or cast. The sheet can then be subjected to a mechanical stress in a longitudinal direction to elongate and molecularly orient it, as by a stretching operation in the presence of heat or other softening agent, or by a cold drawing method, or, again, by applying a mechanical stress to its surface. The direction of stretch or other application of orienting stress is to be taken as having been performed toward and away from the viewer, namely, in a direction normal to the plane of the paper. This being the case, the optic axis 20 of layer 16 constitutes a direction both in the plane of layer 16 and normal to the plane of the paper.

Birefringent layer 16, having acquired the desired birefringence as, for example, a birefringence of 1.50 and 2.00, assuming the stated refractive indices, can then be subjected to surface modification to form thereon the converging or positive lenticular elements **16*a* and the diverging but functionally converging or positive lenticular elements 16*b***. This can be suitably performed by passing the material between embossing means such as embossing blades, wheels or the like, the surfaces being slightly softened as by a solvent or heat, or both, as may be necessary during their treatment but not to such an extent as would relax the material and alter the previously provided orientation and birefringence. The embossing procedure is preferably performed in a direction along that of the optic axis, to facilitate preservation of the given orientation. Accordingly, the lenticules, as illustrated, are generally cylindrical with their axes extending parallel to the optic axis. As will be apparent and explained in further detail below, the lenticules play a major role in the predetermined separation and focusing of the respective rays. While lenticular means of the type described constitute one preferred configuration, they may be so formed as to extend in other directions of the sheet or even have a spherical shape, provided that their refractive characteristics are properly chosen and the birefringence of the material is suitable. Alternatively, the lenticules may be formed by a grinding and polishing procedure or the sheet may be stretched or otherwise treated for orienting its molecules after the lenticules have been formed thereon.

After completion of the surfacing of the birefringent layer 16 and either prior to or after its orientation, the isotropic layers 14 and 18 are assembled therewith or formed thereon by any appropriate method such as by casting them in liquid form on the preformed layer 16. Assuming that the material of layers 14 and 18 is not of a type to cause any disturbing double refraction of light rays when solidified and subjected to mechanical stress, as by stretching, the stretching and desired molecular orientation of layer 16 may be accomplished after casting and solidifying layers 14 and 18 on it surfaces, the entire sheet 10 then being stretched as a unit. Or, the layers 14 and 18 may be cast on layer 16 after orientation of the latter. Alternatively, and again assuming layers 14 and 18 to be substantially incapable of becoming birefringent when stressed, they may be preformed so as to have the lenticular surfaces shown, superimposed in correctly spaced relation, the birefringent layer 16 formed therebetween in a fluid state and solidified, and the entire unit then stretched. In a further modification, the layers 14 and 18 may be preformed and assembled with layer 16, in either a bonded or nonbonded relation therewith, after the layer 16 has been treated to acquire a proper birefringence.

It has been noted with reference to FIG. 5, that the lenticules **16*a* and 16*b* are relatively offset from left to right, that is transversely of the sheet 10, so that the vertices of lenticules 16*a* are optically aligned with the longitudinal edges or intersections of lenticules 16*b*. While the lenticules 16*a* and 16*b*** are shown as being spherical and of similar radii of curvature it will be understood that neither of these conditions is essential, per se, the choice depending in general upon the directions in which the rays are required to be refracted, the extent of their travel in said directions, and such factors as the refractive indices and thicknesses of the layers.

The collimated beams 12, emanating, for example, from a light source and reflector of a headlamp (not shown) and normally incident upon the isotropic layer 14, are transmitted without deviation through the latter to the converging cylindrical lenticules **16*a* of birefringent layer 16. At layer 16 each beam is resolved into two components, that is an ordinary or "O" ray 12*a* and an extraordinary or "E" ray 12*b*. Bearing in mind that the refractive index of isotropic layer 14 has been given as 1.50 and the refractive indices of birefringent layer 16 as 1.50 and 2.00 let it be assumed that the 1.50 refractive index applies to the components 12*a* which, for purposes of illustration, will be considered the ordinary rays vibrating substantially at right angles to the optic axis. Inasmuch as these rays have a refractive index which is essentially identical to that of layer 14, which precedes layer 16 in order of their travel, they are refracted by lenticules 16*b* so to converge generally toward a theoretical focal plane, not shown. The rays 12*a* pass through isotropic layer 14 without deviation inasmuch as the refractive index of 1.50 and that of layer 14 are substantially identical. The components 12*b*, which in this instance are taken as the extraordinary rays vibrating in a plane passing through or parallel with the optic axis and having a refractive index of 2.00 identical to that of the isotropic layer 18, are refracted by the lenticules 16*a* because of the dissimilarity of respective refractive indices. However, the diverging or negative lenticular surface 16*a* constitutes, in effect a converging lenticular surface of isotropic layer 14, the components 12*b* thereby being refracted convergently toward the aforesaid theoretical focal plane. As described, the layer 16 is positively birefringent inasmuch as the refractive index of the E ray is represented as greater than that of the O ray, but a reverse condition is possible. The rays 12***a* and 12*b*, generated in birefringent layer 16 are plane polarized, their vibration directions being at 90° to one another as indicated. The rays are thence transmitted without alteration of their state of polarization with their vibrational planes normal to one another.

Either the E or the O ray, or both, may be selectively treated, as by passing them through retardation materials, to provide their vibrations in a single azimuth as will be described below. Even without such treatment and a nonuniformity of vibration directions, the sheet material of FIG. 5 has certain uses such, for example, as for illumination purposes where it is desired to polarize the light partially in a given direction, for three-dimensional viewing or for any function wherein transmission of a large part of the incident light is of importance but wherein completely uniform polarization throughout a given area is not essential. While the entering rays 12 are shown as collimated at 90° to the plane of the sheet, a slight departure from this condition, from left-to-right in the drawing, can exist without preventing operation of the device of FIG. 5 or of others illustrated herein and a wide deviation therefrom may exist in a direction along the axis of the lenticules.

Consistent with obtaining an operational refraction or non-refraction of rays generally similar to that shown in FIG. 5, the several layers may be formed of substantially any materials having suitable refractive indices, transparency and physical or mechanical properties such as thermal stability, flexibility or adhesion. Thus, for example, layer 14 may be composed of any of such materials as tetrafluoroethylene, vinyl acetate, cellulose acetate butyrate, an acrylic material, glass or the like. Birefringent layer 16 can be, for example, poly[2,2'-bis(trifluoromethyl)-4,4'-biphenylene]-4'',4'''-stilbenedicarboxamide having indices of refraction 1.61 and 2.48 or a layer of poly(2,2'-dibromo-4,4'-biphenylene)-4'',4'''-stilbenedicarboxamide having indices of 1.77 and 2.64. Layer 18 can be a polymeric material which has been rendered birefringent but which has its optic axis or direction of molecular orientation at 90° to that of layer 16, it being understood that its lenticular surface would match with that of layer 16 at 16*b*.

In an optical device of the present invention, the indices of refraction of the several layers can be modified or adjusted in predetermined manner such that the proper functional relation between the indices of refraction of the several layers is maintained. Thus, the indices of refraction of the several layers may be controlled in predetermined fashion by altering plasticizer content. For example, the index may be lowered by the addition of plasticizer. Where bonding substances or subcoats are employed in laminating preformed layers, a material used for such a purpose should have an index of refraction similar to that of one of the layers undergoing bonding to prevent unwanted reflection.

According to another embodiment of the present invention there is provided a light-polarizing element comprising a prismatic layer of molecularly oriented birefringent material and an isotropic or functionally isotropic layer. Such an element can be utilized in a device such as the headlamp of an automotive vehicle.

In FIG. 6 there is shown a headlamp 30 which includes a specularly reflecting parabolic mirror 32, a filament 34, a diffusely reflecting plate element 36 and a light-polarizing sheet material 40. Light-polarizing element 40 includes a prismatic layer 42 of molecularly oriented and highly birefringent polymer and an isotropic layer 44, the refractive index of the isotropic layer 44 substantially matching the low index of refraction of birefringent layer 42. Thus, for example, birefringent layer 42 may have refractive indices of 2.00 and 1.50 and layer 44 a refractive index of 1.50. An unpolarized collimated beam 12, upon entering birefringent layer 42, is resolved into O and E components 12*a* and 12*b*, as previously described in connection with the device shown in FIG. 5. The prism elements of birefringent layer 42 are so formed and disposed relative to the incident collimated beam 12 that the E ray 12*b* is reflected rearwardly to the parabolic mirror 32, is reflected to diffusely reflecting element 36, whereat it is depolarized, is reflected to mirror 32 and thence to light-polarizing sheet material 40 as a second collimated unpolarized beam 12*d*. The prism elements, may, for this purpose, appropriately be prisms or so-called hollow corner cubes which have the characteristic of reflecting collimated light rays in the direction whence they came. The O ray 12*a* is transmitted without deviation straight through layer 44 which matches its refractive index. This procedure repeats itself, ad infinitum, it being apparent that eventually substantially all of the light from source 34 is transmitted in the form of collimated O rays having a uniform azimuth of polarization.

According to still another embodiment of the present invention, there is provided a multilayer light-polarizing device effective to linearly polarize a large portion of the light incident thereon and to transmit substantially all of one polarized component of light while reflecting substantially all of the orthogonally polarized component. Such a polarizer is shown in FIG. 7 as polarizer 50 having alternate layers 54 and 56 of molecularly-oriented, highly-birefringent material and of isotropic or functionally isotropic material.

The layers 54 are each composed of a molecularly oriented birefringent material. For instance, the material may comprise poly[2,2'-bis(trifluoromethyl)-4,4'-biphenylene]2'',2'''-dimethoxy-4'',4'''-biphenyldicarboxamide. Other materials can also be utilized in forming the birefringent layer and should be selected to have as great a difference between the two indices of refraction as possible since the number of layers in the polarizer can be substantially decreased when using birefringent materials having a greater difference between their indices of refraction.

The isotropic layers 56 may be composed of a number of different materials with the requirement that its refractive index substantially match one of the refractive indices of the birefringent material layers on either side thereof. Some examples of materials which are useful for this purpose include polyacrylates, poly(2,2'-dibromo-4,4'-biphenylene)4'',4'''-stilbenedicarboxamide, silicon oxides or titanium dioxides. The isotropic layers can be provided, for example, by vacuum deposition so that their thickness can be precisely controlled. Alternately, the isotropic layer may be co-extruded simultaneously with the birefringent layers interleaved therebetween.

As shown in FIG. 7 the optical axis 58 of each birefringent layer lies in a plane parallel to the planar substrate surface 60. This is accomplished, for example, through the use of a stretch orientation operation. Layer thickness can be suitably controlled by the extrusion process and allowances for dimensional changes expected in the layer thickness during the stretching step can be made.

FIG. 7 schematically shows a number of light rays 62 incident on polarizer 50 and traveling in a direction perpendicular to the surface thereof. As an example, the birefringent layers 54 may have a pair of refractive indices of $n_O=1.50$ and $n_E=2.00$ and the refractive index of each isotropic layer may be taken as $n=1.50$. As each ray 62 passes through the first birefringent layer 54, it is resolved thereby into two components shown as separate rays, namely, an extraordinary or "E" ray *62a* for which the birefringent layer has the higher index $n_E=2.00$ and an ordinary ray or "O" ray *62b* for which the birefringent layer has, for example, the lower index $n_O=1.50$, the rays traveling in a similar direction and with their vibration azimuths relatively orthogonally disposed as depicted in the drawing. As shown in FIG. 7, a portion *62c* of the "E" rays *62a* is reflected at the first interface 64 reached, it being recalled that the refractive index of an isotropic layer was given at $n=1.50$. The reflection is due to the refractive index discontinuity at the interface between the layers 54 and 56 which exists for the "E" polarization but not the "O" polarization. For purposes of illustration the reflected light rays *62c* are shown as being reflected at a slight angle while in actuality they are reflected straight back in the direction of rays *62a*. Thereafter each interface such as 66 and 68 will reflect a further portion of ray *62a*. The rays *62b* are unreflected at the interface 64 because the refractive index for "O" rays *62b* in layer 54 matches that of layer 56 and in fact, these rays *62b* will pass through all layers 54 and 56 unreflected and comprise that portion of the light incident on the polarizer that is transmitted thereby.

In order to greatly increase the reflectivity of the polarizer 50 each layer 54 and 56 is made to have an optical thickness of one-quarter the length of a selected wavelength. The optical thickness is equal to the physical thickness multiplied by the index of refraction of the layer material. The wavelength selected is preferably in the middle of the visible spectrum, for example, 550 nm so that the polarizer is effective over a substantial range of visible light. This arrangement utilizes optical interference to enhance the efficiency of the polarizer. The following discussion relates to phase changes in a light wave, not to changes in the the polarization azimuth of the light wave. In analyzing the optical properties of the polarizer, it is important to remember that light suffers a phase change of $\pi$ on reflection when it goes from a medium of low refractive index to a medium of higher refractive index while it suffers no phase change on reflection when it goes from a medium of high refractive index to a medium with a lower refractive index. Thus, in FIG. 7, a light ray such as *62a*, as it passes through the first quarterwave birefringent layer 54 will suffer a phase change $\pi/2$. As the light ray strikes the first interface 64 part of it is reflected back through the first birefringent layer 54 again suffering a phase change of $\pi/2$, the total phase change being equal of $\pi/2+\pi/2=\pi$. Note that the ray *62a* suffers no phase change on reflection at interface 64 due to the rule as stated above. Now as the remaining portion of ray *62a* strikes the second interface 66, it has traveled through two layers suffering a phase change of $\pi/2+\pi/2$ in one direction and $\pi/2+\pi/2$ on reflection. The ray *62a* will also suffer a phase change of $\pi$ on reflection due to the above rule and the total phase change will equal 4 $\pi/2+\pi$ or 3 $\pi$. Thus, in accordance with this analysis, the ray *62a* will always suffer a phase change of some multiple of $\pi$ as it is reflected from each and every interface in the multilayer polarizer. Each reflected component *62c* of ray *62a* and other such similar rays will reinforce one another resulting in substantially total reflection of the one polarized component of incident light represented by rays *62a* providing the number of layers and interfaces are sufficient. The other component *62b* will pass undisturbed through the multilayer polarizer 50 so long as the refractive index of the isotropic layers 56 match one of the refractive indices of the birefringent layers 54. Since substantially none of the rays *62a* are transmitted, the entire amount of light output from polarizer 50 consists of rays *62b*, all polarized in one direction.

In FIG. 8 is shown an optical beam-splitter device of the present invention embodying a layer of birefringent polymer. Beam splitter 70 comprises prisms **72*a* and 72*b* of isotropic material such as glass joined in a Nicol configuration with a layer 74 of molecularly oriented birefringent polymer therebetween. Elements 72*a* and 72*b* can be composed of a variety of glass or other isotropic materials and will have a perpendicular index of refraction greater than that of the polymer layer 74 between such elements. For example, a unidirectionally stretched layer 74 of poly-[2,2'-bis(trifluoromethyl)-4,4'-biphenylene]-2,2'-dimethoxy-4,4'-biphenyl having a perpendicular index of refraction of about 1.65 and a unidirectional stretch direction as indicated in FIG. 8 can be utilized between isotropic glass elements 72*a* and 72*b* of refractive index 1.8. In operation, unpolarized light 76 enters element 72*a* and a portion thereof is reflected at the interface of element 72*a* and layer 74 so as to emerge as plane-polarized light 78. A portion of light 76 is refracted by layer 74 and emerges from element 72*b* as oppositely plane-polarized light 80. Light 76 is thus split into separate beams of oppositely polarized light by beam splitter 70**.

While particular embodiments of the present invention utilizing polymeric birefringent layers have been described in connection with the devices shown in FIGS. 5 to 7, other devices utilizing such polymeric birefringent layers can also be prepared. Examples of other devices which can be adapted to include a polymeric and highly birefringent layer as described herein are described, for example, in U.S. Pat. No. 3,506,333 (issued Apr. 14, 1970 to E. H. Land; in U.S. Pat. No. 3,213,753 (issued Oct. 26, 1965 to H. G. Rogers); in U.S. Pat. No. 3,610,729 (issued Oct. 5, 1971 to H. G. Rogers); in U.S. Pat. No. 3,473,013 (issued Oct. 14, 1969 to H. G. Rogers); in U.S. Pat. No. 3,522,984 (issued Aug. 4, 1970 to H. G. Rogers); in U.S. Pat. No. 3,522,985 (issued Aug. 4, 1970 to H. G. Rogers); in U.S. Pat. No. 3,528,723 (issued Sept. 15, 1970 to H. G. Rogers); and in U.S. Pat. No. 3,582,424 (issued June 1, 1971 to K. Norvaisa). Still other devices that can be prepared utilizing a birefringent polymer hereof include Wollaston prisms, Rochon prisms, Fuessner prisms, Brewster polarizers, non-polarizing beam splitters, compensators and the like.

The following non-limiting examples are illustrative of the present invention.

EXAMPLE 1

This example illustrates the preparation of poly (2,2'-dibromo-4,4'-biphenylene)-p,p'-biphenylene dicarboxamide and the preparation therefrom of birefringent polymeric films.

A 50-ml. reaction vessel (a resin-making kettle equipped with a mechanical stirrer, nitrogen inlet tube and calcium chloride drying tube) was heated while simultaneously flushing the vessel with nitrogen. After the reaction vessel had cooled to room temperature, 1.63 grams of anhydrous lithium chloride and 0.5746 gram (0.001679 mole) of sublimed 2,2'-dibromobenzidine were added while maintaining a positive nitrogen pressure. The reaction vessel was fitted with a thermometer and a rubber stopple (a rubber membrane-like sealing lid capable of receiving a syringe and of sealing itself upon removal of the syringe). Ten mls. of anhydrous distilled N-methylpyrrolidone (NMP) and 15 mls. of anhydrous distilled tetramethylurea (TMU) were carefully added with the aid of syringes. The resulting mixture was stirred and warmed to 40° C. until all solids had dissolved. The solution was then cooled in a bath of ice and salt to a temperature of −5° C. A small amount of lithium chloride precipitation was observed. Recrystallized p,p'-biphenylene dicarbonyl chloride (0.4689 gram; 0.001679 mole) was quickly added by means of a funnel to the stirred 2,2'-dibromobenzidine solution. An additional five mls. of TMU were added through the funnel to the reaction mixture. The temperature of the reaction mixture did not rise above a temperature of 7° C. After stirring for 60 minutes, the reaction mixture began to thicken and streaming birefringence (but not stir opalescence) was observed.

The ice bath was removed from the reaction vessel and the temperature was observed to rise to 20° C. in 30 minutes at which point the reaction solution became milky in appearance. The reaction vessel was placed in an oil bath (40° C.) and the reaction mixture was warmed for 30 minutes. The reaction mixture became clear. The temperature of the reaction mixture rose during the warming to a maximum temperature of 55° C. at which temperature the reaction mixture was stirred for one hour. The reaction product, a 3% wt./vol. polymer solution (three grams of polymer per 100 mls. of reaction solvent) was cooled to 40° C. and poured into 200 mls. of icewater in a blender. The resulting fibrous solid was filtered and washed (in the blender) twice each with water, acetone and ether. The product was dried in a vacuum oven at 15 mm. pressure and 90° C. for 18 hours. The product, obtained in 95.4% yield, was a white fibrous polymeric material having the following recurring structural units:

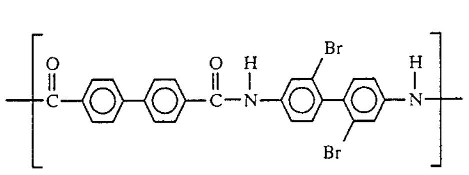

The inherent viscosity of a polymer solution (0.5 gram of the polymer of Example 1 per 100 mls. of a solution of five grams lithium chloride per 100 mls. of dimethylacetamide) was 3.54 dl./gram at 30° C.

Molecular structure was confirmed by infrared spectroscopy. Inspection of the ultraviolet/visible absorption spectrum for the polymer of Example 1 (in 5% wt./vol. lithium chloride/dimethylacetamide showed a $\lambda_{max}$ of 320($\epsilon$=75,000).

Elemental analysis for $C_{26}H_{16}Br_2N_2O_2$ provided the following:

| | % C | % H | % Br | % N | % O | |
|---|---|---|---|---|---|---|
| Calculated: | 56.97 | 2.92 | 29.16 | 5.11 | 5.84 | (by difference) |
| Found: | 56.86 | 3.25 | 28.72 | 5.10 | 6.07 | |

Polymeric films were prepared from the polymeric material of Example 1 by casting (onto glass plates) solutions of the polymeric material in a 5% wt./vol. solution of lithium chloride and dimethylacetamide (five grams lithium chloride per 100 mls. of dimethylacetamide). The concentration of polymer ranged from 0.5 to 5% wt./vol., i.e., from 0.5 gram to five grams polymer per 100 mls. of the lithium chloride/dimethylacetamide solution. In each instance, the glass plate carrying the puddle-cast polymer solution was immersed in water (after minimal evaporation of solvent). The polymer film was observed to gel and a transparent and colorless unoriented film separated from the glass plate. The resulting film was soaked for several hours in water to effect extraction of occluded lithium chloride and solvent, soaked in acetone and dried in a vacuum oven at 90° C. and 15 mm. pressure. Refractive index, measured by interferometry, was 1.93.

Stretched polymeric films were prepared in the following manner. Water-swollen films (obtained by soaking the polymer films for several hours for removal of occluded lithium chloride and solvent as aforedescribed) were cut into strips. The strips were mounted between the jaws of a mechanical unidirectional stretcher. The strips were stretched (in air at 220° C.) to about 50% elongation, to effect film orientation. The resulting films were optically transparent. Birefringence, measured with the aid of a quartz wedge, was 0.293.

EXAMPLE 2

This example illustrates the preparation of poly (2,2'-dinitro-4,4'-biphenylene)-o,o'-dinitro-p,p'-biphenylene dicarboxamide and the preparation therefrom of birefringent polymeric films.

A 50-ml. reaction vessel (a resin-making kettle equipped with a mechanical stirrer, nitrogen inlet tube and calcium chloride drying tube) was heated while simultaneously flushing the vessel with nitrogen. After the reaction vessel had cooled to room temperature, 1.5 grams of anhydrous lithium chloride and 0.4799 gram (0.001750 mole) of recrystallized 2,2'-dinitrobenzidine yellow crystals were added while maintaining a positive nitrogen pressure. The reaction vessel was fitted with a thermometer and a rubber stopple and 30 mls. of anhydrous distilled N-methylpyrrolidone (NMP) and 20 mls. of anhydrous distilled tetramethylurea (TMU) were carefully added with the aid of syringes. The resulting mixture was stirred and warmed to 40° C. until all solids had dissolved. The solution was then cooled in a bath of ice and salt to a temperature of −5° C. Recrystallized colorless 2,2'-dinitro-4,4'-biphenyl dicarbonyl chloride (0.6460 gram; 0.00175 mole) was quickly added by means of a funnel to the stirred 2,2'-dinitrobenzidine solution. An additional three mls. of NMP were added through the funnel to the reaction mixture. The temperature of the reaction mixture did not rise above a temperature of 0° C. After stirring for 30 minutes, there was no noticeable change in reaction mixture viscosity.

The ice bath was removed from the reaction vessel and the temperature was observed to rise to 20° C. in 30 minutes at which point the reaction solution was heated in stages up to 90° C. over a period of 2.5 hours.

The reaction product, a 3% wt./vol. polymer solution (three grams of polymer per 100 mls. of reaction solvent) was cooled to 40° C. and poured into 200 mls. of ice-water in a blender. The resulting gelatinous solid was filtered and washed (in the blender) twice each with water, acetone and ether. The product was dried in a vacuum oven at 15 mm. pressure and 90° C. for 18 hours. The polymeric product, obtained in 88% yield, was a dark-yellow powder having the following recurring structural units:

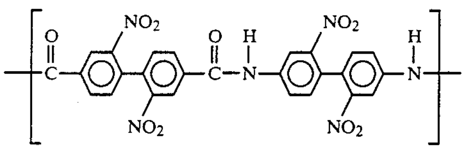

The inherent viscosity of a polymer solution (0.5 grams of the polymer of Example 2 per 100 mls. of a solution of five grams lithium chloride per 100 mls. of dimethylacetamide) was 1.40 dl./gram at 30° C.

Molecular structure was confirmed by infrared spectroscopy. Inspection of the ultraviolet/visible absorption spectrum for the polymer of Example 2 (in 5% wt./vol. lithium chloride/dimethylacetamide) showed a $\lambda_{max}$ of 307 nm ($\epsilon$=38,400) and an absorption peak at 365 nm ($\epsilon$=3,000).

Elemental analysis for $C_{26}H_{14}N_6O_{10}$ provided the following:

| | % C | % H | % N | % O | |
|---|---|---|---|---|---|
| Calculated: | 54.74 | 2.47 | 14.73 | 28.06 | (by difference) |
| Found | 54.24 | 2.60 | 13.91 | 29.25 | |

Thermogravimetric analysis showed that onset of degradation of the polymer of Example 2 occurred at 360° C. in nitrogen and at 300° C. in air. Differential scanning calorimetry and thermal mechanical analysis of film samples showed a reproducible transition at about 190° C.

Polymeric films were prepared from the polymeric material of Example 2 by casting (onto glass plates)a solution of the polymeric material in a 5% wt./vol. solution of lithium chloride and dimethylacetamide (five grams lithium chloride per 100 mls. of dimethylacetamide). The concentration of polymer was 5% wt./vol., i.e., five grams polymer per 100 mls. of the lithium chloride/dimethylacetamide solution. In each instance, the glass plate carrying the puddle-cast polymer solution was immersed in water (after most of the solvent had evaporated). The polymer film was observed to gel and a transparent, yellow unoriented film separated from the glass plate. The resulting film was soaked for several hours in water to effect extraction of occluded lithium chloride and solvent.

Stretched polymeric films were prepared in the following manner. Water-swollen films (obtained by soaking the polymer films for several hours for removal of occluded lithium chloride and solvent as aforedescribed) were cut into strips. The strips were mounted between the jaws of a mechanical unidirectional stretcher. The strips were stretched (in boiling ethylene glycol) to about 60% elongation, to effect film orientation. The resulting polymeric strips were optically transparent. Birefringence, measured with the aid of a quartz wedge, and by index matching, was 0.33. The calculated isotropic refractive index was 1.75. Wide-angle X-ray analysis of the birefringent films showed crystallinity to be less than 10% by weight.

EXAMPLE 3

This example illustrates the preparation of poly (2,2'-dibromo-4,4'-biphenylene)-o,o'-dibromo-p,p'-biphenylene dicarboxamide and the preparation therefrom of birefringent polymeric films.

A 50-ml. reaction vessel (a resin-making kettle equipped with a mechanical stirrer, nitrogen inlet tube and calcium chloride drying tube) was heated while simultaneously flushing the vessel with nitrogen. After the reaction vessel had cooled to room temperature, 2.0 grams of anhydrous lithium chloride and 0.7828 gram (0.002289 mole) of sublimed 2,2'-dibromobenzidine were added while maintaining a positive nitrogen pressure. The reaction vessel was fitted with a thermometer and a rubber stopple and 20 mls. of anhydrous distilled N-methylpyrrolidone (NMP) and 35 mls. of anhydrous distilled tetramethylurea (TMU) were carefully added with the aid of syringes. The resulting mixture was stirred and warmed to 40° C. until all solids had dissolved. The solution was then cooled in a bath of ice and salt to a temperature of 0° C. Recrystallized 2,2'-dibromo-4,4'-biphenylene dicarbonyl chloride (1.0000 gram; 0.002289 mole) was quickly added by means of a funnel tc the stirred 2,2'-dibromobenzidine solution. An additional five mls. of TMU, at a temperature of 25° C., were added through the funnel to the reaction mixture. The temperature of the reaction mixture rose to 15° C. and then dropped to 4° C. After stirring for 15 minutes, the reaction mixture began to thicken and streaming birefringence (but not stir opalescence) was observed. Stirring was continued for an additional 30 minutes at 7° C. and the ice bath was removed from the reaction vessel. The temperature of the reaction mixture rose to 25° C. (in 90 minutes) and the reaction mixture was then slowly heated to 100° C. over a two-hour period.

The reaction product, a 4% wt./vol. polymer solution (four grams of polymer per 100 mls of reaction solvent) was cooled to 40° C. and poured into 200 mls. of ice-water in a blender. The resulting fibrous solid was filtered and washed (in the blender) twice each with water, acetone and ether. The product was dried in a vacuum oven at 15 mm. pressure and 90° C. for 18 hours. The product, obtained in 96.6% yield, was a white fibrous polymeric material having the following recurring structural units:

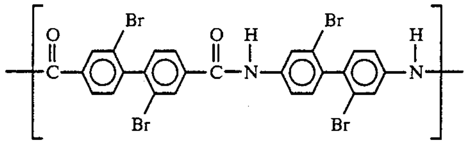

The inherent viscosity of a polymer solution (0.5 grams of the polymer of Example 3 per 100 mls. of a solution of five grams lithium chloride per 100 mls. of dimethylacetamide) was 2.04 dl./gram at 30° C. Molecular weight determination based on light scattering, indicated $2.72\times10^5$, and by gel permeation chromatography, a molecular weight of $5.66\times10^4$. Molecular structure was confirmed by infrared spectroscopy. Inspection of the ultraviolet/visible absorption spectrum for the polymer of Example 3 (in 5% wt./vol. lithium chloride/dimethylacetamide) showed a $\lambda_{max}$ of 305 nm ($\epsilon$=31,900) and no absorption above 380 nm.

Elemental analysis for $C_{26}H_{14}Br_4N_2O_2$ provided the following:

| | % C | % H | % Br | % N | % O | |
|---|---|---|---|---|---|---|
| Calculated: | 44.23 | 1.99 | 45.27 | 3.99 | 4.52 | (by difference) |
| Found: | 44.54 | 2.19 | 45.25 | 3.87 | 4.15 | |

Thermogravimetric analysis showed that onset of degradation of the polymer of Example 3 occurred at 530° C. in nitrogen. Thermal mechanical analysis of film samples showed a reproducible transition at about 120° C.

Polymeric films were prepared from the polymeric material of Example 3 by casting (onto glass plates) solutions of the polymeric material in a 5% wt./vol. solution of lithium chloride and dimethylacetamide (five grams lithium chloride per 100 mls. of dimethylacetamide). The concentration of polymer ranged from 0.5 to 5% wt./vol., i.e., from 0.5 gram to 5 grams polymer per 100 mls. of the lithium chloride/dimethylacetamide solution. In each instance, the glass plate carrying the puddle-cast polymer solution was immersed in water (after most of the solvent had evaporated). The polymer film was observed to gel and a transparent, colorless unoriented film separated from the glass plate. The resulting film was soaked for several hours in water to effect extraction of occluded lithium chloride and solvent, soaked in acetone and dried in a vacuum oven at 90° C. and 15 mm. pressure. Refractive index, measured by interferometry, was 1.84.

Stretched polymeric films were prepared in the following manner. Water-swollen films (obtained by soaking the polymer films for several hours for removal of occluded lithium chloride and solvent as aforedescribed) were cut into strips. The strips were mounted for stretching between the jaws of a mechanical unidirectional stretcher. Strips were stretched, in some instances, in air at 220° C. and, in other instances, in boiling ethylene glycol. Elongation ranged from 60% to 65%. Infrared dichroism indicated that the films were less than 65% oriented. The films were optically transparent. Birefringence, measured with the aid of a quartz wedge, was 0.390. Wide-angle X-ray analysis of the birefringent polymer films showed them to be less than 10% by weight crystalline.

EXAMPLE 4

This example illustrates the preparation of poly (2,2'-dichloro-5,5'-dimethoxy-biphenylene)-o,o'-dibromo-p,p'-biphenylene dicarboxamide and the preparation therefrom of birefringent polymeric films.

A 50-ml. reaction vessel (a resin-making kettle equipped with a mechanical stirrer, nitrogen inlet tube and calcium chloride drying tube) was heated while simultaneously flushing the vessel with nitrogen. After the reaction vessel had cooled to room temperature, 1.5 grams of anhydrous lithium chloride and 0.6519 gram (0.002082 mole) of sublimed 2,2'-dichloro-5,5'-dimethoxybenzidine were added while maintaining a positive nitrogen pressure. The reaction vessel was fitted with a thermometer and a rubber stopple and ten mls. of anhydrous distilled N-methylpyrrolidone (NMP) and ten mls. of anhydrous distilled tetramethylurea (TMU) were carefully added with the aid of syringes. The resulting mixture was stirred and warmed to 40° C. until all solids had dissolved. The resulting orange solution was then cooled in a bath of ice and salt to a temperature of 0° C. A small amount of lithium chloride precipitation was observed. Recrystallized 2,2'-dibromo-4,4'-biphenyldicarbonyl chloride (0.9095 gram; 0.002082 mole) was quickly added by means of a funnel to the stirred 2,2'-dichloro-5,5'-dimethoxybenzidine solution. An additional ten mls. of TMU (at a temperature of 25° C.) were added through the funnel to the reaction mixture. The temperature of the reaction mixture did not rise above a temperature of 0° C. After stirring for 30 minutes, the formation of a gelatinous, light-yellow, transparent mass (which exhibited streaming birefringence but not stir opalescence) was observed. Stirring was continued for an additional ten minutes at 8° C., the stirring was stopped and the ice bath was removed. The temperature of the reaction mass was observed to rise to 25° C. in 15 minutes, and the gel became stiffer in consistency. Heating was immediately commenced and an additional 20 mls. of TMU were added to facilitate dissolution of the reaction mass. Within 60 minutes the temperature rose to 90° C. and the gel melted to provide a homogeneous, viscous solution. Heating at 90° C. was continued for two hours while stirring vigorously.

The reaction product, a 2.82% wt./vol. light-yellow polymer solution (2.82 grams of polymer per 100 mls. of reaction solvent) was cooled to 40° C. and the resulting gelatinous, transparent mass was added to 200 mls. of ice-water in a blender. The resulting rubbery solid was filtered and washed (in the blender) twice each with water, acetone and ether. The product was dried in a vacuum oven at 15 mm. pressure and 90° C. for 18 hours. The product, obtained in 99.3% yield, was a very pale-yellow fibrous polymeric material having the following recurring structural units:

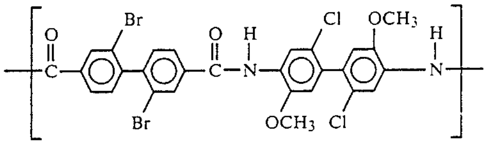

The inherent viscosity of a polymer solution (0.5 gram of the polymer of Example 4 per 100 mls. of a solution of five grams lithium chloride per 100 mls. of dimethylacetamide) was 5.75 dl./gram at 30° C.

Molecular structure was confirmed by infrared spectroscopy. Elemental analysis for $C_{28}H_{18}Br_2Cl_2N_2O_4$ provided the following:

| | % C | % H | % Br | % Cl | % N | % O |
|---|---|---|---|---|---|---|
| Calculated: | 49.66 | 2.68 | 23.60 | 10.47 | 4.14 | 9.45 |
| Found: | 49.05 | 2.95 | 23.07 | — | 4.15 | — |

Polymeric films were prepared from the polymeric material of Example 4 by casting (onto glass plates) solutions of the polymeric material in a 5% wt./vol. solution of lithium chloride and dimethylacetamide (five gms. lithium chloride per 100 mls. of dimethylacetamide). The concentration of polymer was 2% wt./vol., i.e., two grams of polymer per 100 mls. of the lithium chloride/dimethylacetamide solution. In each instance, the glass plate carrying the puddle-cast polymer solution was immersed in water (after minimal evaporation of solvent. The polymer film was observed to gel and a transparent, colorless unoriented film separated from the glass plate. The resulting film was soaked for two days in water to effect extraction of occluded lithium chloride and solvent, soaked in acetone and dried in a vacuum oven at 90° C. and 15 mm. pressure. Refractive index, measured by interferometry was 1.87.

Stretched polymeric films were prepared in the following manner. Water-swollen films (obtained by soaking the polymer films for several hours for removal of occluded lithium chloride and solvent as aforedescribed) were cut into strips. The strips were mounted between the jaws of a mechanical unidirectional stretcher. The strips were stretched (in air at 220° C.) to about 50% elongation, to effect film orientation. The stretched films were optically transparent. Birefringence, measured with the aid of a quartz wedge, was 0.24.

Solutions of the polymer of Example 4, in a concentration of 3 to 5% wt./vol., in lithium chloride-containing solvents (e.g., dimethylacetamide containing lithium chloride) were found to form colorless, transparent gels which could be melted and resolidified without thermal degradation. When the molten solutions were poured into molds or cast into films, solidification was rapid and the solid pieces or films were readily removable. The resulting rubbery solids exhibited high birefringence upon application of very slight stress. Removal of the stress was accompanied by instantaneous disappearance of the birefringent property.

EXAMPLE 5

This example illustrates the preparation of poly (2,2'dibromo-4,4'-biphenylene)-octafluoro-p,p'-biphenylene dicarboxamide and the preparation therefrom of birefringent polymeric films.

A 50-ml. reaction vessel (a resin-making kettle equipped with a mechanical stirrer, nitrogen inlet tube and calcium chloride drying tube) was heated while simultaneously flushing the vessel with nitrogen. After the reaction vessel had cooled to room temperature, 1.5 grams of anhydrous lithium chloride and 0.4571 gram (0.001338 mole) of sublimed 2,2'-dibromobenzidine were added while maintaining a positive nitrogen pressure. The reaction vessel was fitted with a thermometer and a rubber stopple and ten mls. of anhydrous distilled N-methylpyrrolidone (NMP) and ten mls. of anhydrous distilled tetramethylurea (TMU) were carefully added with the aid of syringes. The resulting mixture was stirred and warmed to 40° C. until all solids had dissolved. The solution was then cooled in a bath of ice and salt to a temperature of 0° C. A small amount of lithium chloride precipitation was observed. Distilled 2,2'3,3',5,5',6,6'-octafluoro-4,4'-biphenylene dicarbonyl chloride (0.5660 gram; 0.001338 mole) was quickly added by means of a funnel to the stirred, 2,2'-dibromobenzidine solution. An additional ten mls. of TMU (at a temperature of 25° C.) were added through the funnel to the reaction mixture. The temperature of the reaction mixture did not rise above a temperature of 2° C. After stirring for 15 minutes, the reaction mixture began to thicken and streaming birefringence (but not stir opalescence) was observed. Stirring was continued for an additional 30 minutes at 4° C. and the ice bath was removed. The temperature of the reaction mixture was observed to rise to 25° C. in 40 minutes at which point the reaction solution was slightly viscous and cloudy in appearance. The reaction mixture was warmed gently for 90 minutes with stirring. The temperature of the reaction mixture rose during the warming to a maximum temperature of 45° C. at which temperature the reaction solution became homogeneous. Stirring was continued for 18 hours at 45° C.

The resulting reaction product, a 3% wt./vol. polymer solution (three grams of polymer per 100 mls. of reaction solvent) was cooled to 40° C. and poured into 200 mls. of ice-water in a blender. The resulting fibrous solid was filtered and washed (in the blender) twice each with water, acetone and ether. The product was dried in a vacuum oven at 15 mm. pressure and 90° C. for 18 hours. The product, obtained in 87.6% yield, was a white fibrous polymeric material having the following recurring structural units:

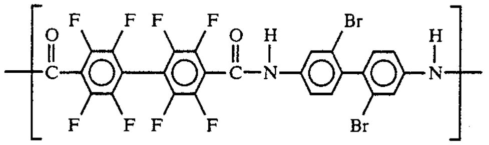

The inherent viscosity of a polymer solution (0.5 gram of the polymer of Example 5 per 100 mls. of a solution of five grams lithium chloride per 100 mls. of dimethylacetamide) was 1.68 dl./gram at 30° C.

Molecular structure was confirmed by infrared spectroscopy. Inspection of the ultraviolet/visible absorption spectrum for the polymer of Example 5 (in 5% wt./vol. lithium chloride/dimethylacetamide) showed a $\lambda_{max}$ of 340 nm and an absorption peak at 360 nm ($\epsilon$=306).

Elemental analysis for $C_{26}H_8Br_2F_8N_2O_2$ provided the following:

| | % C | % H | % Br | % F | % N | % O | |
|---|---|---|---|---|---|---|---|
| Calculated: | 45.11 | 1.17 | 23.09 | 21.97 | 4.05 | 4.61 | (by |
| Found: | 42.89 | 1.17 | 21.86 | 20.81 | 3.76 | 9.51 | difference) |

Thermogravimetric analysis showed that onset of degradation of the polymer of Example 5 occurred at 325° C. in nitrogen and at 350° C. in air. Differential scanning calorimetry showed a reproducible transition at about 155° C.

Polymeric films were prepared from the polymeric material of Example 5 by casting (onto glass plates) solutions of the polymeric material in a 2% wt./vol. solution of lithium chloride and dimethylacetamide (two grams lithium chloride per 100 mls. of dimethylacetamide). The concentration of polymer ranged from 0.5 to 5% wt./vol., i.e., from 0.5 gram to five grams polymer per 100 mls. of the lithium chloride/dimethylacetamide solution In each instance, the glass plate carrying the puddle-cast polymer solution was immersed in water (after minimal evaporation of solvent) The polymer was observed to gel and a transparent and colorless unoriented film separated from the glass plate. The resulting film was soaked for several hours in water to effect extraction of occluded lithium chloride and solvent, soaked in acetone and dried in a vacuum oven at 90° C. and 15 mm. pressure. Refractive index, measured by interferometry was 1.74.

Stretched polymeric films were prepared in the following manner. Water-swollen films (obtained by soaking the polymer films for several hours for removal of occluded lithium chloride and solvent as aforedescribed) were cut into strips. The strips were mounted between the jaws of a mechanical unidirectional stretcher. The strips were oriented by stretching (in air at 200° C.)to an elongation in the range of 50 to 55%. The polymeric strips were optically transparent. Birefringence, measured with the aid of a quartz wedge, was 0.35. Strips were also stretched in methanol at 25° C. to an elongation of 55%. Measurement of birefringence for such stretched films showed a birefringence of 0.44.

EXAMPLE 6

This example illustrates the preparation of poly (2,2',3,3',4,4',6,6'-octafluoro-4,4'-biphenylene)carbohydrazide and the preparation therefrom of birefringent polymeric films.

A 50-ml. reaction vessel (a resin-making kettle equipped with a mechanical stirrer, nitrogen inlet tube and calcium chloride drying tube) was heated while simultaneously flushing the vessel with nitrogen. After the reaction vessel had cooled to room temperature, 1.15 grams of anhydrous lithium chloride and 0.0386 gram (0.001205 mole) of distilled hydrazine were added while maintaining a positive nitrogen pressure. The reaction vessel was fitted with a thermometer and a rubber stopple and seven mls. of anhydrous distilled N-methylpyrrolidone (NMP) and 12 mls. of anhydrous distilled tetramethylurea (TMU) were carefully added with the aid of syringes. The resulting mixture was stirred until most of the lithium chloride had dissolved. The solution was then cooled in a bath of ice and salt to a temperature of 0° C. A small amount of lithium chloride precipitation was observed. Distilled 2,2',3,3',5,5',6,6'-octafluoro-4,4'-biphenylene dicarbonyl chloride (0.5100 gram; 0.001205 mole) was quickly added by means of a funnel to the stirred hydrazine solution. An additional four mls. of TMU (at a temperature of 25° C.) were added through the funnel to the reaction mixture. The temperature of the reaction mixture did not rise above a temperature of 5° C. The reaction mixture did not thicken and steaming bircfringence was not observed. Lithium carbonate (0.0890 gram; 0.0024 mole) was added to the reaction mixture, stirring was continued for 30 minutes at 4° C. and the ice bath was removed. As the temperature of the reaction mixture rose to 25° C. during the subsequent 60 minutes, the reaction solution first became cloudy and, then, a white precipitate formed. Over the next 30 minutes, the reaction mixture was warmed to 40° C. at which time the reaction mixture became homogeneous. The reaction temperature was raised to 70° C. and maintained for one hour. No increase in viscosity was apparent.

The reaction product, a 1.99% wt./vol. polymer solution (1.99 grams of polymer per 100 mls. of reaction solvent) was cooled to 40° C. and poured into 200 mls. of icewater in a blender. The resulting powdery solid was filtered and washed (in the blender) twice each with water, acetone and ether. The product was dried in a vacuum oven at 15 mm. pressure and 90° C. for 18 hours. The polymeric product, obtained in 95.4% yield, was a white solid material having the following recurring structural units:

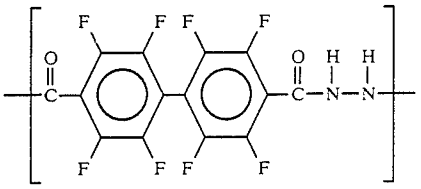

The inherent viscosity of a polymer solution (0.5 gram of the polymer of Example 6 per 100 mls. of a solution of five grams lithium chloride per 100 mls. of dimethylacetamide) was 1.16 dl./gram at 30° C. The molecular structure of the polymer of Example 6 was confirmed by infrared spectroscopy.

Polymeric films were prepared from the polymeric material of Example 6 by casting (onto glass plates) solutions of the polymeric material in a 2% wt./vol. solution of lithium chloride and dimethylacetamide (two grams lithium chloride per 100 mls. of dimethylacetamide). The concentration of polymer ranged from 0.5 to 5% wt./vol., i.e., from 0.5 gram to five grams polymer per 100 mls. of the lithium chloride/dimethylacetamide solution. In each instance, the glass plate carrying the puddle cast polymer solution was immersed in water (after evaporating the solvent for one hour). The polymer film was observed to gel, and a physically weak, cloudy and colorless film separated from the glass plate. The resulting film was soaked for several hours in water to effect extraction of occluded lithium chloride and solvent, soaked in acetone and dried in a vacuum oven at 90° C. and 15 mm. pressure. The films were not of sufficient strength to undergo stretching. Refractive index, measured by interferometry, was 1.60.

EXAMPLE 7

This example illustrates the preparation of poly (2,2'-dibromo-4,4'-biphenylene)-trans-p,p'-stilbene dicarboxamide and the preparation therefrom of birefringent polymeric films.

A 250-ml. reaction vessel (a resin-making kettle equipped with a mechanical stirrer, nitrogen inlet tube and calcium chloride drying tube) was heated while simultaneously flushing the vessel with nitrogen. After the reaction vessel had cooled to room temperature, 4.88 grams of anhydrous lithium chloride and 2.1441 grams (0.006269 mole) of sublimed 2,2'-dibromobenzidine were added while maintaining a positive nitrogen pressure. The reaction vessel was fitted with a thermometer and a rubber stopple and 45 mls. of anhydrous distilled N-methylpyrrolidone (NMP) and 45 mls. of anhydrous distilled tetramethylurea (TMU) were carefully added with the aid of syringes. The resulting mixture was stirred and warmed to 40° C. until all solids had dissolved. The solution was then cooled in a bath of ice and salt to a temperature of −5° C. A small amount of lithium chloride precipitation was observed. Recrystallized trans-p,p'-stilbene dicarbonyl chloride (1.9129 grams; 0.006269 mole) was quickly added by means of a funnel to the stirred 2,2'-dibromobenzidine solution. An additional 30 mls. of NMP/TMU mixture (1:1 by weight), at a temperature of 25° C., were added through the funnel to the reaction mixture. The temperature of the reaction mixture did not rise above a temperature of 5° C. and then dropped rapidly to −3° C. After stirring for 30 minutes, the reaction mixture began to thicken and streaming birefringence (but not stir opalescence) was observed. Lithium carbonate (0.926 gram, 0.01254 mole) was added and stirring was continued for an additional 30 minutes at 0° C.

The ice bath was removed from the reaction vessel, and when the temperature reached 20° C. (in 30 minutes), the reaction solution had become sufficiently viscous as to begin to climb the shaft of the mechanical stirrer. A maximum reaction temperature of 55° C. was reached. Stirring was stopped and the mixture was heated overnight at a temperature of 55° C. The reaction product, a viscous polymer solution of 3% wt./vol. concentration (three grams of polymer per 100 mls. of reaction solvent) was diluted with 130 mls. of 2% wt./vol. lithium chloride in dimethylacetamide. The resulting polymer solution was poured into 200 mls. of ice and water in a blender. The resulting fibrous solid was filtered and washed (in the blender) twice each with water, acetone and ether. The product was dried in a vacuum oven at 15 mm. pressure and 90° C. for 18 hours. The polymeric product, obtained in 100% yield, was a very light-yellow fibrous solid having the following recurring structural units:

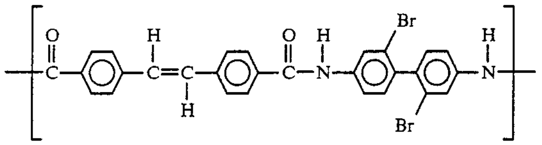

The inherent viscosity of a polymer solution (0.5 gram of the polymer of Example 7 per 100 mls. of a solution of five grams lithium chloride per 100 mls. of dimethylacetamide) was 9.04 dl./gram at 30° C. The molecular weight of the polymer, as determined by light scatterings, was $1.95\times10^6$, and be gel permeation chromatography, $8.71\times10^5$.

The molecular structure of the polymer was confirmed by infrared spectroscopy. Inspection of the ultraviolet/visible spectrum of the polymer (in 5% wt./vol. lithium chloride/dimethylacetamide) showed a $\lambda_{max}$ 352 nm ($\epsilon$=66,000); an absorption peak at 368 nm ($\epsilon$=52,800) and an extremely weak tail at 400 nm.

Elemental analysis for $C_{28}H_{18}Br_2N_2O_2$ provided the following:

| | % C | % H | % Br | % N | % O | |
|---|---|---|---|---|---|---|
| Calculated: | 58.56 | 3.16 | 27.83 | 4.88 | 5.57 | (by difference) |
| Found: | 58.50 | 3.22 | 27.94 | 4.87 | 5.47 | |

Thermogravimetric analysis showed that the onset of degradation of the polymer of Example 7 occurred at 470° C. in nitrogen and at 515° C. in air. Differential scanning calorimetry and thermal mechanical analysis of film samples detected a reproducible transition at about 225° C.

Polymeric films were prepared from the polymeric material of Example 7 by casting (onto glass plates) solutions of the polymeric material in a 5% wt./vol. solution of lithium chloride and dimethylacetamide (five grams lithium chloride per 100 mls. of dimethylacetamide). The concentration of polymer ranged from 1 to 5% wt./vol., i.e., from one gram to five grams polymer per 100 mls. of the lithium chloride/dimethylacetamide solution. In each instance, the glass plate carrying the puddle-cast polymer solution was immersed in water (after minimal evaporation of solvent). The polymer was observed to gel and a transparent and colorless unoriented film separated from the soaked glass plate. The resulting film was soaked for several hours in water to effect extraction of occluded lithium chloride and solvent, soaked in acetone and dried in a vacuum oven at 90° C. and 15 mm. pressure. Refractive index, measured by interferometry, was 2.03.

Stretched polymeric films were prepared in the following manner. Water-swollen films (obtained by soaking the polymer films for several hours for removal of occluded lithium chloride and solvent as aforedescribed) were cut into strips. The strips were mounted between the jaws of a mechanical unidirectional stretcher. The strips were stretched (in air at 220° C.) to about 55 to 55% elongation, to effect film orientation. The stretched films were optically transparent. Infrared dichroism indicated that the stretched films were less than 65% by weight oriented; the modulus was $3.9\times10^6$ p.s.i. Wide-angle X-ray analysis of the films showed crystallinity to be less than 10% by weight. Birefringence, measured with the aid of a quartz wedge, was 0.589.

Solutions of the polymer of Example 7 in lithium chloride/dimethylacetamide, as aforedescribed, were formed into extruded films by the "wet-jet" method whereby the solution of polymer is extruded into an aqueous coagulation bath for gelling of the polymer material. The resulting transparent, colorless film strips were soaked in water and cut to about 1 to 2 inches (25.4 to 50.8 mm.) for testing. The partially oriented strips of film produced by the extrusion were further oriented by stretching in the manner described in the Examples hereof. Stretching was effected in air at a temperature of 180° C. Elongation was to the break point, in the range of about 40% to 50%. The stretched strips were optically transparent. Infrared dichroism indicated that the films were 85% oriented. Measurement of birefringence utilizing a quartz wedge provided a birefringence value of 0.977. Measurement by resort to interferometry provided a value of 0.865.

EXAMPLE 8

This example illustrates the preparation of poly (2,2'-dibromo-4,4'-biphenylene)-trans-α-bromo-p,p'-stilbene dicarboxamide and the preparation therefrom of birefringnet polymeric films.

A 50-ml. reaction vessel (a resin-making kettle equipped with a mechanical stirrer, a pressure-equalizing dropping funnel, a nitrogen inlet tube and calcium chloride drying tube) was heated while simultaneously flushing the vessel with nitrogen. After the reaction vessel had cooled to room temperature, 1.5 grams of anhydrous lithium chloride and 0.4779 gram (0.001397 mole) of sublimed 2,2'-dibromobenzidine were added while maintaining a positive nitrogen pressure. The reaction vessel was fitted with a thermometer and a rubber stopple and 15 mls. of anhydrous distilled N-methylpyrrolidinone (NMP) and five mls. of anhydrous distilled tetramethylurea (TMU) were carefully added with the aid of syringes. The resulting mixture was stirred and warmed to 40° C. until all solids had dissolved. The solution was then cooled in a bath of ice and salt to a temperature of 0° C. A small amount of lithium chloride precipitation was observed. Recrystallized α-bromo-p,p'-stilbene dicarbonyl chloride (0.5366 gram; 0.001397 mole) was quickly added by means of a funnel to the stirred 2,2'-dibromobenzidine solution. An additional ten mls. of TMU (at a temperature of 25° C.) were added through the funnel to the reaction mixture. The temperature of the reaction mixture did not rise above a temperature of 4° C. After stirring for 15 minutes, the reaction mixture began to thicken and streaming birefringence (but not stir opalescence) was observed. Stirring was continued for an additional 30 minutes at 4° C.

The ice bath was removed from the reaction vessel and the temperature was observed to rise to 25° C. in 90 minutes at which point the reaction mixture had become sufficiently viscous as to climb the shaft of the mechanical stirrer. Over the next 90 minutes, the very pale-yellow reaction mass was gently warmed with intermittant stirring; the maximum temperature reached was approximately 70° C.

The reaction product, a 3% wt./vol. polymer solution (three grams of polymer per 100 mls. of reaction solvent) was cooled to 40° C. and poured into 200 mls. of ice-water in a blender. The resulting fibrous solid was filtered and washed (in the blender) twice each with water, acetone and ether. The product was dried in a vacuum oven at 15 mm. pressure and 90° C. for 18 hours. The product, obtained in 95.4% yield, was a light-yellow fibrous polymeric material having the following recurring structural units:

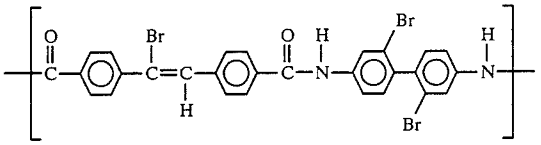

The inherent viscosity of a polymer solution (0.5 gram of the polymer of Example 8 per 100 mls. of a solution of five grams lithium chloride per 100 mls. of dimethylacetamide) was 7.81 dl./gram at 30° C.

Molecular structure was confirmed by infrared spectroscopy. Elemental analysis for $C_{28}H_{17}N_2Br_3O_2$ provided the following:

| | % C | % H | % Br | % N | % O | |
|---|---|---|---|---|---|---|
| Calculated: | 51.478 | 2.604 | 36.724 | 4.289 | 4.90 | (by |
| Found: | 51.17 | 2.80 | 34.82 | 4.15 | 7.06 | difference) |

Polymeric films were prepared from the polymeric material of Example 8 by casting (onto glass plates) solutions of the polymeric material in a 5% wt./vol. solution of lithium chloride and dimethylacetamide (five grams lithium chloride per 100 mls. of dimethylacetamide). The concentration of polymer ranged from 0.5 to 5% wt./vol., i.e., from 0.5 gram to 5 grams polymer per 100 mls. of the lithium chloride/dimethylacetamide solution. In each instance, the glass plate carrying the puddle-cast polymer solution was immersed in water (after minimal evaporation of solvent). The polymer was observed to gel and a transparent and colorless unoriented film separated from the soaked glass plate. The resulting film was soaked for several hours in water to effect extraction of occluded lithium chloride and solvent, soaked in acetone and dried in a vacuum oven at 90° C. and 15 mm. pressure. Refractive index, measured by interferometry, was 2.07.

Stretched polymeric films were prepared in the following manner. Water-swollen films (obtained by soaking the polymer films for several hours for removal of occluded lithium chloride and solvent as aforedescribed) were cut into strips. The strips were mounted between the jaws of a mechanical unidirectional stretcher. The strips were stretched (in air at 220° C.) to about 60% to 65% elongation, to effect film orientation. The stretched strips were optically transparent. Birefringence, measured with the aid of a quartz wedge, was 0.680.

Solutions of the polymer of Example 8 in lithium chloride/dimethylacetamide, as aforedescribed, were formed into extruded films by the "wet-jet" method whereby the solution of polymer is extruded into an aqueous coagulation bath for gelling of the polymer material. The resulting transparent, colorless film strips were soaked in water and cut to about 1 to 2 inches (25.4 to 50.8 mm.) for testing. The partially oriented strips of film produced by the extrusion were further oriented by stretching in the manner described in the Examples hereof. Stretching was effected in air (at a temperature of 180° C.) to the break point, in the range of about 40% to 50% elongation. The stretched film strips were optically transparent. Measurement of birefringence utilizing a quartz wedge provided a birefringence value of 0.955. Measurement by resort to interferometry provided a value of 0.849.

EXAMPLE 9

This example illustrates the preparation of poly (2,2'-dibromo-4,4'-biphenylene)-α,α'-dimethylmuconamide and the preparation therefrom of birefringent polymeric films.

A 50-ml. reaction vessel (a resin-making kettle equipped with a mechanical stirrer, a pressure-equalizing dropping funnel, a nitrogen inlet tube and calcium chloride drying tube) was heated while simultaneously flushing the vessel with nitrogen. After the reaction vessel had cooled to room temperature, 0.4 gram of anhydrous lithium chloride and 0.8519 gram (0.00249 mole) of sublimed 2,2'-dibromobenzidine were added while maintaining a positive nitrogen pressure. The reaction vessel was fitted with a thermometer and a rubber stopple and ten mls. of anhydrous distilled N-methylpyrrolidone (NMP) were carefully added with the aid of a syringe. The resulting mixture was stirred and warmed to 40° C. until all solids had dissolved. The solution was then cooled in a bath of ice and salt to a temperature of 0° C. with formation of some lithium chloride precipitate. A solution of recrystallized α,α'-dimethyl muconyl chloride(0.5157 gram; 0.002491 mole) in six mls. of anhydrous, distilled tetrahydrofuran(THF) was added to the dropping funnel through a rubber stopper with a syringe. The α,α'-dimethyl muconyl chloride/THF solution, the temperature of which was 25° C., was added dropwise over five minutes to the cold 2,2'-dibromobenzidine solution while stirring moderately. The addition funnel was rinsed with six mls. of NMP which was also added dropwise to the reaction mixture in order to prevent the temperature of the reaction mixture from rising above 1° C. After stirring for one hour, during which time the solution turned lemon-yellow (but did not thicken), 0.354 gram of solid lithium carbonate was added all at once to the reaction mixture. Within ten minutes noticeable thickening was observed, and after an additional 20 minutes, at 20° C., the viscosity increased further. The ice bath was removed from the reaction vessel and the temperature of the reaction mixture was allowed to rise to 25° C. over a one-hour period during which time a thick paste had formed. The temperature of the reaction mixture was increased to 65° C. over the next 20 minutes producing a mixture which could no longer be stirred. Additional heating for 18 hours at 55° C. without stirring produced a transparent, light-yellow viscous polymer solution. The reaction product, a 5.36% wt./vol. polymer solution (5.36 grams of polymer per 100 mls. of reaction solvent) was observed to exhibit considerable streaming birefringence upon application of low mechanical stress; stir opalescence was not, however, observed.

The polymer solution was poured into a blender containing 200 ml. of ice-water and the resulting fibrous solid was filtered and washed (in the blender) twice each with water, acetone and ether. The product was dried in a vacuum oven at 15 mm. pressure and 90° C. for 18 hours. The product, obtained in 94.7% yield, was a white fibrous polymeric material having the following recurring structural units:

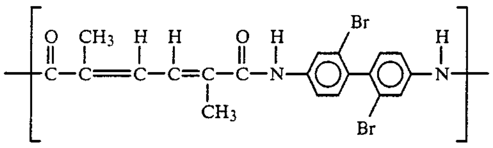

The inherent viscosity of a polymer solution (0.5 grams of the polymer of Example 9 per 100 mls. of a solution of five grams lithium chloride per 100 mls. of dimethylacetamide) was 4.69 dl./gram at 30° C.

Molecular structure was confirmed by infrared spectroscopy. Inspection of the ultraviolet/visible absorption spectrum for the polymer of Example 9 (in 3% wt./vol. lithium chloride/dimethylacetamide showed a $\lambda_{max}$ of 333 nm($\epsilon$=33,600) and an extremely weak tail at 400 nm.

Elemental analysis for $C_{20}H_{16}Br_2N_2O_2$ provided the following:

| | % C | % H | % Br | % N | % O | |
|---|---|---|---|---|---|---|
| Calculated: | 50.448 | 3.387 | 33.562 | 5.883 | 6.72 | (by |
| Found: | 50.09 | 3.45 | 34.17 | 5.72 | 6.57 | difference) |

Thermogravimetric analysis showed that the onset of degradation occurred at 360° C. in nitrogen and at 310° C. in air. Differential scanning calorimetry and thermal mechanical analysis of film samples showed a reproducible transition at about 185° C.

Polymeric films were prepared from the polymeric material of Example 9 by casting (onto glass plates) solutions of the polymeric material in a 5% wt./vol. solution of lithium chloride and dimethylacetamide (five grams lithium chloride per 100 mls. of dimethylacetamide). The concentration of polymer ranged from 2 to 4% wt./vol.,-i.e., from two grams to four grams polymer per 100 mls. of the lithium chloride/dimethylacetamide solution. In each instance, the glass plate carrying the puddle-cast polymer solution was immersed in water (after minimal evaporation of solvent). The polymer film was observed to gel and a transparent and colorless unoriented film separated from the glass plate. The resulting film was soaked for several hours in water to effect extraction of occluded lithium chloride and solvent, soaked in acetone and dried in a vacuum oven at 90° C. and 15 mm. pressure. Refractive index, measured by interferometry,was 1.91.

Stretched polymeric films were prepared in the following manner. Water-swollen films (obtained by soaking the polymer films for several hours for removal of occluded lithium chloride and solvent as aforedescribed) were cut into strips. The strips were mounted between the jaws of a mechanical stretcher and were unidirectionally stretched, successively, in steam, acetone and boiling ethylene glycol (all of which function as plasticizers). The strips were stretched to an elongation of from 35% to 45%. The film strips were further elongated (up to 60%) by stretching in air at 200° C. The stretched strips were optically transparent. Optical retardation was measured with a calibrated quartz wedge; film thickness was measured with a micrometer. Birefringence, measured by means of a quartz wedge, was 0.40.

EXAMPLE 10

For purposes of comparison with the substituted polyamides of the present invention, an unsubstituted polyamide was prepared and evaluated in the following manner.

A solution polymerization reaction for the production of poly(p-benzamide) was conducted in accordance with the following reaction scheme:

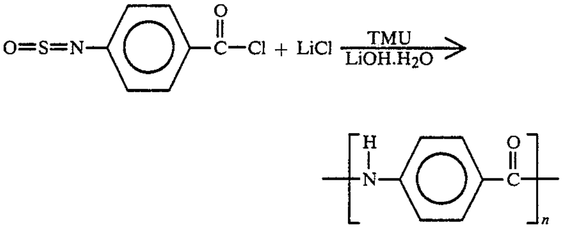

A 50-ml. reaction vessel (a resin-making kettle equipped with mechanical stirrer, nitrogen inlet tube and calcium chloride drying tube) was heated while simultaneously flushing the vessel with nitrogen. After the reaction vessel had cooled to room temperature, 40 mls. of anhydrous distilled tetramethyl urea (TMU), 8.04 grams (0.04 mole) of vacuum-distilled p-thionylaminobenzoyl chloride and 0.52 gram (0.012 mole) of lithium chloride were added while maintaining a positive nitrogen pressure. The resulting reaction mixture was stirred for ten minutes at room temperature and 1.68 grams (0.04 mole) of lithium hydroxide monohydrate were added while vigorously stirring. The reaction mixture was then stirred for one hour at room temperature. After a period of seven additional minutes, the reaction mixture became cloudy and was observed to thicken. The polymeric reaction product, aftcr 20 minutes, thickened sufficiently to adhere the shaft of the mechanical stirrer. After one-half hour, the reaction mixture, which could not be stirred, was heated. An additional quantity (14 mls.) of TMU was added at which point the reaction mixture still could not be stirred. The reaction mixture was then heated to 130° C. without stirring. After two hours of heating at 130° C., pliability of polymeric reaction mass increased and the product appeared to have partially dissolved. The reaction product was stored in the reaction vessel overnight and was washed with water, filtered and washed with acetone then ether. The product, poly (p-benzamide) was dried in a vacuum oven at 80° C. for two hours.

The inherent viscosity of a polymer solution of poly(p-benzamide) in sulfuric acid was 1.60 dl./gram at 30° C.

Polymeric films of poly(p-benzamide) were prepared by casting a solution of the polymeric material in a 5% wt./vol. solution of lithium chloride and dimethylacetamide (five grams lithium chloride per 100 mls. of dimethylacetamide). The concentration of polymer was 5% wt./vol., i.e., five grams polymer per 100 mls. of the lithium chloride/dimethylacetamide solution. The cast polymer film was dried in a vacuum oven at 90° C. (30 in. Hg) overnight. The polymer film was an opaque, white flexible film. Additional films were formed by puddle-casting the solution as aforedescribed onto glass plates. In each instance, the glass plate carrying the puddle-cast polymer solution was immersed in water (after most of the solvent had evaporated). The polymer film which separated from the glass plate was a tough, transparent, flexible film. The resulting film was soaked for several hours in water to effect extraction of occluded lithium chloride and solvent.

Stretched polymeric films were prepared in the following manner. Water-swollen films (obtained by soaking the polymer films for several hours for removal of occluded lithium chloride and solvent as aforedescribed) were cut into strips. The strips were mounted between the jaws of a mechanical stretcher and were unidirectionally stretched, successively, in steam and in air (at 200° C.). The strips were stretched to an elongation of approximately 10%. The resulting stretched films were clouded in appearance. Optical retardation was measured with a calibrated quartz wedge; film thickness was measured with a micrometer. Birefringence, measured by means of a quartz wedge, was 0.23.

By inspection of the values of birefringence described in connection with the substituted polyamides of the present invention and the Examples hereof (Examples 1 to 9), it can be seen that the birefringence of poly(p-benzamide) of comparative Example 10, was, in general, decidedly lower.

EXAMPLE 11

This example illustrates the preparation of poly[2,2'-bis(trifluoromethyl)-4,4'-biphenylene]-trans-p,p'-stilbene dicarboxamide and the preparation therefrom of birefringent polymeric films.

A 100 ml. reaction vessel (a resin-making kettle equipped with a mechanical stirrer, nitrogen inlet tube and calcium chloride drying tube) was heated while simultaneously flushing the vessel with nitrogen. After the reaction vessel had cooled to room temperature, 1.5 grams of anhydrous lithium chloride and 0.5171 gram (0.001615 mole) of recrystallized 2,2'-bis(trifluoromethyl)-benzidine were added while maintaining a positive nitrogen pressure. The reaction vessel was fitted with a thermometer and a rubber stopple and ten mls. of anhydrous distilled N-methylpyrrolidone (NMP) and ten mls. of anhydrous distilled tetramethylurea (TMU) were carefully added with the aid of syringes. The resulting mixture was stirred and warmed to 40° C. until all solids had dissolved. The solution was then cooled in a bath of ice and salt to a temperature of −5° C. A small amount of lithium chloride precipitation was observed. Recrystallized trans-p,p'-stilbene dicarbonyl chloride (0.4923 gram; 0.001615 mole) was carefully added by means of a funnel to the stirred 2,2'-bis(trifluoromethyl)-benzidine solution. An additional 10 mls. of TMU, at a temperature of 0° C., were added through the funnel to the reaction mixture. The temperature of the reaction mixture did not rise above a temperature of 5° C. and then dropped rapidly to −3° C. After stirring for 30 minutes, the reaction mixture began to thicken and streaming birefringence (but not stir opalescence) was observed. Stirring was continued for an additional 30 minutes at 0° C.

The ice bath was removed from the reaction vessel, and when the temperature reached 20° C. (in 30 minutes), the reaction solution had become very viscous. Over the next 75 minutes, the completely colorless, transparent solution was warmed to 72° C. After stirring at this temperature for the next 18 hours, the mixture was cooled to 40° C. The resulting polymer solution was poured into 200 mls. of ice and water in a blender. The resulting fibrous solid was filtered and washed (in the blender) twice each with water, acetone and ether. The product was dried in a vacuum oven at 15 mm. pressure and 90° C. for 18 hours. The polymeric product, obtained in 99.5% yield, was a very light-yellow fibrous solid having the following recurring structural units:

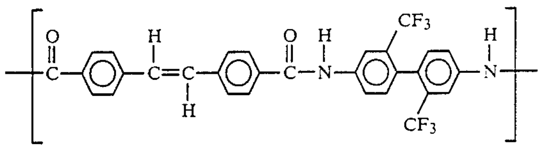

The inherent viscosity of a polymer solution (0.5 gram of the polymer of Example 11 per 100 mls. of a solution of five grams lithium chloride per 100 mls. of dimethylacetamide) was 4.735 dl./gram at 30° C. The molecular structure of the polymer was confirmed by infrared spectroscopy.

Elemental analysis for $C_{30}H_{18}F_6N_2O_2$ provided the following:

| | % C | % H | % F | % N | % O | |
|---|---|---|---|---|---|---|
| Calculated: | 65.22 | 3.28 | 20.64 | 5.07 | 5.79 | (by difference) |
| Found: | 64.54 | 3.76 | 19.04 | 4.85 | 7.81 | |

Thermogravimetric analysis showed that the onset of degradation of the polymer of Example 11 occurred at 500° C. in nitrogen and at 410° C. in air. Differential scanning calorimetry and thermal mechanical analysis of film samples detected a reproducible transition at about 185° C.

Polymeric films were prepared from the polymeric material of Example 11 by casting (onto glass plates) solutions of the polymeric material in a 5% wt./vol. solution of lithium chloride and dimethylacetamide (five grams lithium chloride per 100 mls. of dimethylacetamide). The concentration of polymer ranged from 1.0 to 5% wt./vol., i.e., from 1.0 gram to five gramps polymer per 100 mls. of the lithium chloride/dimethylacetamide solution. In each instance, the glass plate carrying the puddle-cast polymer solution was immersed in water (after minimal evaporation of solvent). The polymer film was observed to gel and a transparent and colorless unoriented film separated from the glass plate. The resulting film was soaked for several hours in water to effect extraction of occluded lithium chloride and solvent, soaked in acetone and dried in a vacuum oven at 90° C. and 15 mm. pressure. Refractive index, measured by interferometry, was 1.997.

Stretched polymeric films were prepared in the following manner. Water-swollen films (obtained by soaking the polymer films for several hours for removal of occluded lithium chloride and solvent as aforedescribed) were cut into strips. The strips were mounted between the jaws of a mechanical unidirectional stretcher. The strips were stretched (in air at 220° C.) to about 60 to 65% elongation, to effect film orientation. The stretched films were optically transparent. Birefringence, measured with the aid of a quartz wedge, was 0.537.

Solutions of the polymer of Example 11 in lithium chloride/dimethylacetamide, as aforedescribed, were formed into extruded films by the "wet-jet" method whereby the solution of polymer is extruded into an aqueous coagulation bath for gelling of the polymer material. The resulting transparent, colorless film strips were soaked in water and cut to about 1 to 2 inches (25.4 to 50.8 mm.) for testing. The partially oriented strips of film produced by the extrusion were further oriented by stretching in the manner described in the Examples hereof. Stretching was effect to an elongation of less than 20%. The stretched strips were optically transparent. Infrared dichroism indicated that the films were 92% oriented. Measurement of birefringence utilizing a quartz wedge provided a birefringence value of 0.879.

EXAMPLE 12

This example illustrates the preparation of poly-[2,2'-bis(trifluoromethyl)-4,4'-biphenylene]-2,2'-dimethoxy-4,4'-biphenylene dicarboxamide and the preparation therefrom of birefringent polymeric films.

A 100-ml. reaction vessel (a resin-making kettle equipped with a mechanical stirrer, a pressure-equalizing dropping funnel, a nitrogen inlet tube and calcium chloride drying tube) was heated while simultaneously flushing the vessel with nitrogen. After the reaction vessel had cooled to room temperature, 3.0 grams of anhydrous lithium chloride and 0.4328 gram (0.001352 mole) of recrystallized 2,2'-bis (trifluoromethyl)benzidine were added while maintaining a positive nitrogen pressure. The reaction vessel was fitted with a thermometer and a rubber stopple and 20 mls. of anhydrous distilled N-methylpyrrolidinone (NMP) and 20 mls. of anhydrous distilled tetramethylurea (TMU) were carefully added with the aid of syringes. The resulting mixture was stirred and warmed to 40° C. until all solids had dissolved. The solution was then cooled in a bath of ice and salt to a temperature of −5° C. A small amount of lithium chloride precipitation was observed. Recrystallized 2,2'-dimethoxy-4,4'-biphenyldicarbonyl chloride (0.4586 gram; 0.001352 mole) was quickly added by means of a funnel to the stirred 2,2'-bis(trifluoromethyl)benzidine solution. An additional 20 mls. of TMU (at a temperature of 0° C.) were added through the funnel to the reaction mixture. The temperature of the reaction mixture did not rise above a temperature of 5° C. After stirring for 30 minutes, the reaction mixture began to thicken and turned milk-like in appearance. Stirring was continued for an additional 30 minutes at 0° C.

The ice bath was removed from the reaction vessel and the temperature was observed to rise to 20° C. in 30 minutes at which point the reaction mixture was viscous and opaque. Over the next 75 minutes, the opaque reaction mass was gently warmed to 40° C. at which point it became transparent. After stirring at this temperature for the next 18 hours, the reaction mixture was cooled to 30° C. and poured into 400 mls. of ice-water in a blender. The resulting fibrous solid was filtered and washed (in the blender) twice each with water and ether. The product was dried in a vacuum oven at 15 mm. pressure and 90° C. for 18 hours. The product, obtained in 99.3% yield, was an off-white fibrous polymeric material exhibiting solubility in acetone or tetrahydrofuran and having the following recurring structural units:

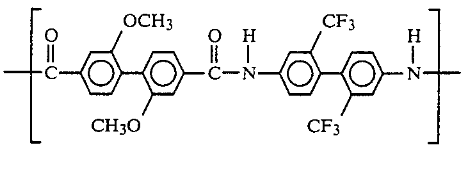

The inherent viscosity of a polymer solution (0.5 gram of the polymer of Example 12 per 100 mls. of a solution of five grams lithium chloride per 100 mls. of dimethylacetamide) was 1.69 dl./gram at 30° C.

Molecular structure was confirmed by infrared spectroscopy. Inspection of the ultraviolet visible spectrum of the polymer (in 5% wt./vol. lithium chloride/dimethylformamide) showed a $\lambda_{max}$ of 316 nm ($\epsilon=2.59\times10^3$).

Elemental analysis for $C_{30}H_{20}F_6N_2O_4$ provided the following:

| | % C | % H | % F | % N | % O | |
|---|---|---|---|---|---|---|
| Calculated: | 61.34 | 3.43 | 19.41 | 4.77 | 10.89 | (by difference) |
| Found: | 59.82 | 3.51 | 18.70 | 4.62 | 13.35 | |

Thermogravinetic analysis showed that the onset of degradation of the polymer of Example 12 occurred at 470° C. in nitrogen and at 440° C. in air. Differential scanning colorimetry detected a reproducible transition at about 180° C.

Polymeric films were prepared from the polymeric material of Example 12 by casting (onto glass plates) solutions of the polymeric material in a 5% wt./vol. solution of lithium chloride and dimethylacetamide (five grams lithium chloride per 100 mls. of dimethylacetamide). The concentration of polymer ranged from 1% to 5% wt./vol., i.e., from 1.0 gram to 5 grams polymer per 100 mls. of the lithium chloride/dimethylacetamide solution. In each instance, the glass plate carrying the puddle-cast polymer solution was immersed in water (after minimal evaporation of solvent). The polymer was observed to gel and a transparent and colorless unoriented film separated from the soaked glass plate. The resulting film was soaked for several hours in water to effect extraction of occluded lithium chloride and solvent, soaked in acetone and dried in a vacuum oven at 90° C. and 15 mm. pressure. Refractive index, measured by interferometry, was 1.73.

Solutions of the polymer of Example 12 in lithium chloride/dimethylacetamide, as aforedescribed, were formed into extruded films by the "wet-jet" method whereby the solution of polymer is extruded into an aqueous coagulation bath for gelling of the polymer material. The resulting transparent, colorless film strips were soaked in water and cut to about 1 to 2 inches (25.4 to 50.8 mm.) for testing. The partially oriented strips of film produced by the extrusion were further oriented by stretching in the manner described in the Examples hereof. Stretching was effected in air (at a temperature of 180° C.) to an elongation of less than 20%. The stretched film strips were optically transparent. Infrared dichroism indicated that the films were 92% oriented. Measurement of birefringence utilizing a quartz wedge provided a birefringence value of 0.586.

EXAMPLE 13

This example illustrates the preparation of poly[2,2',3'',2'''-tetrakis(trifluoromethyl)-1,1':4',1'':4'',1''':4'''-quaterphenylene]-trans-p,p'-stilbenedicarboxamide and the preparation therefrom of birefringent polymeric films.

A 100 ml. reaction vessel (a resin-making kettle equipped with a mechanical stirrer, nitrogen inlet tube and calcium chloride drying tube) was heated while simultaneously flushing the vessel with nitrogen. After the reaction vessel had cooled to room temperature, 1.5 grams of anhydrous lithium chloride and 0.5806 gram (0.0009543 mole) of recrystallized 4,4'''-diamino-2,2',3'',2'''-tetrakis(trifluoromethyl)-1,1':4',1'':4'',1'''-quaterphenyl were added while maintaining a positive nitrogen pressure. The reaction vessel was fitted with a thermometer and a rubber stopple and ten mls. of anhydrous distilled N-methylpyrrolidone (NMP) and ten mls. of anhydrous distilled tetramethylurea (TMU) were carefully added with the aid of syringes. The resulting mixture was stirred and warmed to 40° C. until all solids had dissolved. The solution was then cooled in a bath of ice and salt to a temperature of −5° C. A small amount of lithium chloride precipitation was observed. Recrystallized trans-p,p'-stilbene dicarbonyl chloride (0.2909 gram; 0.0009543 mole) was carefully added by means of a funnel to the stirred diaminoquaterphenyl solution. An additional 10 mls. of TMU, at a temperature of 0° C., were added through the funnel to the reaction mixture. The temperature of the reaction mixture did not rise above a temperature of 7° C. and then dropped rapidly to 0° C. After stirring for 30 minutes, the reaction mixture began to thicken and streaming birefringence (but not stir opalescence) was observed. Stirring was continued for an additional 30 minutes at 0° C.

The ice bath was removed from the reaction vessel, and when the temperature reached 20° C. (in 30 minutes), the reaction solution had become very viscous. Over the next 75 minutes, the light yellow, opaque solution was warmed to 45° C. After stirring at this temperature for the next 18 hours, the transparent polymer solution was poured into 200 mls. of ice and water in a blender. The resulting fibrous solid was filtered and washed (in the blender) twice each with water and ether. The product was dried in a vacuum oven at 15 mm. pressure and 90° C. for 18 hours. The polymeric product, obtained in 92.2% yield, was a very light-yellow fibrous solid having the following recurring structural units:

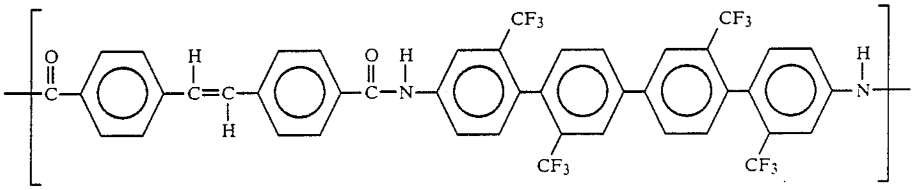

The inherent viscosity of a polymer solution (0.5 gram of the polymer of Example 13 per 100 mls. of a solution of five grams lithium chloride per 100 mls. of dimethylacetamide) was 1.31 dl./gram at 30° C. The molecular structure of the polymer was confirmed by infrared spectroscopy. The polymer was soluble in tetrahydrofuran, in acetone and in various amide-type solvents, with and without added lithium chloride.

Elemental analysis for $C_{44}H_{24}F_{12}N_2O_2$ provided the following:

| | % C | % H | % F | % N | % O | |
|---|---|---|---|---|---|---|
| Calculated: | 62.86 | 2.88 | 27.12 | 3.33 | 3.81 | (by difference) |
| Found: | 62.07 | 3.29 | 24.18 | 3.16 | 7.3 | |

Thermogravimetric analysis showed that the onset of degradation of the polymer of Example 13 occurred at 510° C. in nitrogen and at 440° C. in air. Differential scanning calorimetry and thermal mechanical analysis of film samples detected a reproducible transition at about 187° C.

Polymeric films were prepared from the polymeric material of Example 13 by casting (onto glass plates) solutions of the polymeric material in a 5% wt./vol. solution of lithium chloride and dimethylacetamide (five grams lithium chloride per 100 mls. of dimethylacetamide). The concentration of polymer ranged from 0.5 to 5% wt./vol., i.e., from 0.5 gram to five grams polymer per 100 mls. of the lithium chloride/dimethylacetamide solution. In each instance, the glass plate carrying the puddle-cast polymer solution was immersed in water (after minimal evaporation of solvent). The polymer film was observed to gel and a transparent and colorless unoriented film separated from the glass plate. The resulting film was soaked for several hours in water to effect extraction of occluded lithium chloride and solvent, soaked in acetone and dried in a vacuum oven at 90° C. and 15 mm. pressure. Refractive index, measured by interferometry, was 1.810.

Stretched polymeric films were prepared in the following manner. Water-swollen films (obtained by soaking the polymer films for several hours for removal of occluded lithium chloride and solvent as aforedescribed) were cut into strips. The strips were mounted between the jaws of a mechanical unidirectional stretcher. The strips were stretched in methanol and then in air at 220° C. to effect film orientation. The stretched films were optically transparent. Birefringence, measured with the aid of a quartz wedge, was 0.87.

EXAMPLE 14

This example illustrates the preparation of poly[2,2',3'',2'''-tetrakis(trifluoromethyl)-1,1':4',1'':4'',1''':4'''- quaterphenylene]terephthalamide and the preparation therefrom of birefringent polymeric films.

A 100 ml. reaction vessel (a resin-making kettle equipped with a mechanical stirrer, nitrogen inlet tube and calcium chloride drying tube) was heated while simultaneously flushing the vessel with nitrogen. After the reaction vessel had cooled to room temperature, 1.5 grams of anhydrous lithium chloride and 0.6301 gram (0.001036 mole) of recrystallized 4,4'''-diamino-2,2',3'',2'''-tetrakis(trifluoromethyl)-1,1':4',1'':4'',1'''-quaterphenyl were added while maintaining a positive nitrogen pressure. The reaction vessel was fitted with a thermometer and a rubber stopple and ten mls. of anhydrous distilled N-methylpyrrolidone (NMP) and ten mls. of anhydrous distilled tetramethylurea (TMU) were carefully added with the aid of syringes. The resulting mixture was stirred and warmed to 40° C. until all solids had dissolved. The solution was then cooled in a bath of ice and salt to a temperature of +5° C. A small amount of lithium chloride precipitation was observed. Recrystallized terephthaloylchloride (0.2103 gram; 0.001036 mole) was carefully added by means of a funnel to the stirred 2,2'-diaminoquaterphenyl solution. An additional 10 mls. of TMU, at a temperature of 10° C., were added through the funnel to the reaction mixture. The temperature of the reaction mixture did not rise above a temperature of 10° C. and then dropped to 15° C. After stirring for 30 minutes, the reaction mixture began to thicken and streaming birefringence (but not stir opalescence) was observed. Stirring was continued for an additional 30 minutes at 10° C.

The ice bath was removed from the reaction vessel, and when the temperature reached 27° C. (in 30 minutes), the reaction solution had become very viscous. Over the next 75 minutes, the light yellow, transparent solution was warmed to 40° C. After stirring at this temperature for the next 18 hours, the polymer solution was poured into 200 mls. of ice and water in a blender. The resulting fibrous solid was filtered and washed (in the blender) twice each with water and ether. The product was dried in a vacuum oven at 15 mm. pressure and 90° C. for 18 hours. The polymeric product, obtained in 93.5% yield, was a white fibrous solid having the following recurring structural units:

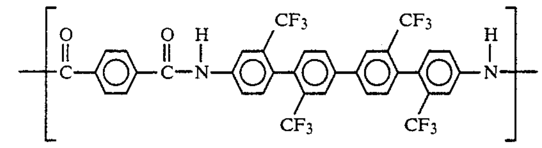

The inherent viscosity of a polymer solution (0.5 gram of the polymer of Example 14 per 100 mls. of a solution of five grams lithium chloride per 100 mls. of dimethylacetamide) was 6.55 dl./gram at 30° C. The molecular structure of the polymer was confirmed by infrared spectroscopy. The polymer was very slightly soluble in acetone, in tetrahydrofuran and in ethyl acetate and was soluble in amide-type solvents with or without added lithium chloride.

Elemental analysis for $C_{36}H_{18}F_{12}N_2O_2$ provided the following:

| | % C | % H | % F | % N | % O |
|---|---|---|---|---|---|
| Calculated: | 58.23 | 2.44 | 30.71 | 3.77 | 4.85 (by difference) |

-continued

| | % C | % H | % F | % N | % O |
|---|---|---|---|---|---|
| Found: | 57.87 | 2.50 | 30.56 | 3.77 | 5.3 |

Thermogravimetric analysis showed that the onset of degradation of the polymer of Example 14 occurred at 440° C. in nitrogen and in air. Differential scanning calorimetry and thermal mechanical analysis of film samples detected a reproducible transition at about 160° C.

Polymeric films were prepared from the polymeric material of Example 14 by casting (onto glass plates) solutions of the polymeric material in a 5% wt./vol. solution of lithium chloride and dimethylacetamide (five grams lithium chloride per 100 mls. of dimethylacetamide). The concentration of polymer ranged from 0.5 to 5% wt./vol., i.e., from 0.5 gram to five grams polymer per 100 mls. of the lithium chloride/dimethylacetamide solution. In each instance, the glass plate carrying the puddle-cast polymer solution was immersed in water (after minimal evaporation of solvent). The polymer film was observed to gel and a transparent and colorless unoriented film separated from the glass plate. The resulting film was soaked for several hours in water to effect extraction of occluded lithium chloride and solvent, soaked in acetone and dried in a vacuum oven at 90° C. and 15 mm. pressure. Refractive index, measured by interferometry, was 1.79.

Stretched polymeric films were prepared in the following manner. Water-swollen films (obtained by soaking the polymer films for several hours for removal of occluded lithium chloride and solvent as aforedescribed) were cut into strips. The strips were mounted between the jaws of a mechanical unidirectional stretcher. The strips were stretched (in air at 220° C.) to effect film orientation. The stretched films were optically transparent. Birefringence, measured with the aid of a quartz wedge, was 0.293.

Solutions of the polymer of Example 14 in lithium chloride/dimethylacetamide, as aforedescribed, were formed into extruded films by the "wet-jet" method whereby the solution of polymer is extruded into an aqueous coagulation bath for gelling of the polymer material. The resulting transparent colorless film strips were soaked in water and cut to about 1 to 2 inches (25.4 to 50.8 mm.) for testing. The partially oriented strips of film produced by the extrusion were further oriented by stretching in the manner described in the Examples hereof. Measurement of birefringence utilizing a quartz wedge provided a birefringence value of 0.44.

EXAMPLE 15

Geometric indices were determined for the repeating units of polymeric materials having the following structure

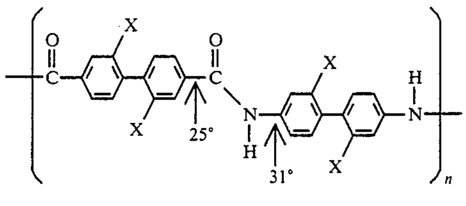

wherein each X is hydrogen or a substituent as set forth in the following TABLE I. In the case of each recurring unit, the eccentricity factor $$\frac{1 + e_L}{1 + e_T}$$

was calculated and is reported in TABLE I. Bond and group polarizability tensors were utilized to calculate a polarizability matrix for each repeat unit, the diagonalized form of the matrix providing the X, Y and Z contributions to the unit polarizability ellipsoid. Axial polarizabilities, i.e., X, Y and Z, were utilized to calculate longitudinal and transverse eccentricities of each repeat unit, thus, reflecting its symmetry.

Eccentricity values were calculated utilizing the following procedure. A polarizability and a corresponding orthogonal coordinate system is assigned to each segment of the polymer repeat unit. Literature values for group polarizabilities are utilized from the literature, or where not available, are constructed from bond polarizabilities. Available Denbigh values were utilized herein for all calculations. Bond polarizabilities are utilized to connect segments where necessary. To determine the overall polarizability of the repeat unit, the coordinate system of the segment at one end of the repeat unit is made coincident with that of the adjacent segment by means of the appropriate rotation(s). This procedure is repeated on each successive segment until the last segment is reached. Mathematically, this means that the matrix of one segment must be pre- and post-multiplied by a transformation matrix:

$$\alpha_1' = \underline{Y}\alpha_1 Y^{-1}$$

where $\alpha_1$ is the polarizability of segment 1; $\underline{Y}$ is the transformation matrix; $Y^{-1}$ is the inverse of $\underline{Y}$; and $\alpha_1'$ is the polarizability of segment 1 in the coordinate system of segment 2. The value of $\alpha_1'$ is then added to $\alpha_2$ and the transformation repeated. The repeat unit polarizability matrix is diagonalized, thus, providing a repeat unit polarizability ellipsoid with three semi-axes, i.e., $\alpha_{xx}$, $\alpha_{yy}$, and $\alpha_{zz}$, where $\alpha_{xx}$ is the major polarizability and is coincident with the polymer backbone.

Literature-reported values of 25° and 31°, respectively, were utilized in all calculations as representing the dihedral angle between the phenyl and carbonyl moieties and the dihedral angle between the phenyl and amino moieties, respectively. Experimentally determined values for the dihedral angle between each X-substituted phenyl moiety were utilized in all calculations and are reported in TABLE I. Mean diameter values, D, and length, L, were obtained from space-filling molecular models.

TABLE I

| Substituent X (Dihedral Angle) | Mean Diameter (D) | Length (L) | $\left(\frac{1 + e_L}{1 + e_T}\right)$ | G |
|---|---|---|---|---|
| H (20°) | 4.49 | 21.35 | 1.061 | 0.989 |
| F (60°) | 4.61 | 21.35 | 1.206 | 1.21 |
| Cl (72°) | 4.78 | 21.35 | 1.348 | 1.23 |
| Br (75°) | 4.83 | 21.35 | 1.388 | 1.24 |
| I (85°) | 4.91 | 21.35 | 1.428 | 1.26 |
| $CF_3$ (80°) | 4.90 | 21.35 | 1.496 | 1.33 |
| $CH_3$ (71°) | 4.76 | 21.35 | 1.330 | 1.25 |

From the data presented in TABLE I will be observed the influence of the nature of the X substituent relative to a hydrogen atom as regards the reported dihedral angle and resulting substantial noncoplanarity between interbonded phenyl rings. Differences in mean diameter and influence of the nature of X substituents on mean diameter and eccentricity factor, and correspondingly, geometric index G will also be observed. Thus, it will be noted that the largest substituents, i.e., $-CF_3$ and $-I$ substituents, corresponded with the largest dihedral angles between interbonded phenyl groups or the highest non-coplanarity and, accordingly, recurring units having such substituents show high geometric index values.

For purposes of comparison, geometric index G was calculated for the repeat unit of poly(p-phenylene)-terephthalamide having the following structure and the results thereof are reported in TABLE II. Dihedral angle values of 25° and 31° were utilized for purposes of calculation as in the case of the repeat units of EXAMPLE 15.

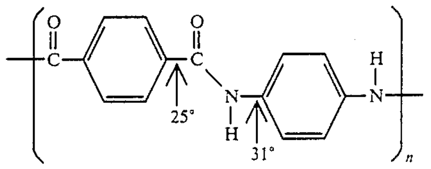

TABLE II

| Mean Diameter (D) | Length (L) | $\frac{1 + e_L}{1 + e_T}$ | G |
|---|---|---|---|
| 4.43 | 12.45 | 0.978 | 0.621 |

As can be observed from inspection of the data reported in TABLES I and II, the geometric indices for the repeat units of the materials set forth in TABLE I are considerably higher than the geometric index calculated for poly(p-phenylene)terephthalamide of TABLE II.

EXAMPLE 16

Geometric indices for the recurring units of polyamides having the following structure were calculated. Each X substituent was as indicated in TABLE III. Dihedral angles from the literature were utilized in such calculations. Calculated geometric indices were compared with values of theoretical maximum birefringence for the polymeric materials, reported in TABLE III. Theoretical maximum birefringence values ($\Delta n_{max}$) were obtained by plotting the orientation function, calculated from infrared dichroism, against experimental birefringence and extrapolating to 100% orientation. The results are set forth in TABLE III.

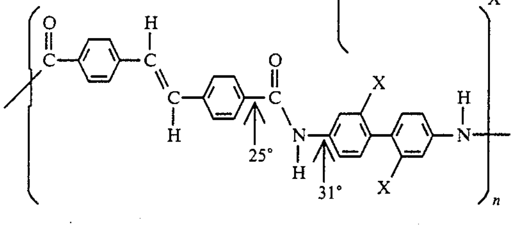

TABLE III

| Substituent X (Dihedral Angle) | G | $\Delta n_{max}$ |
|---|---|---|
| —Br (75°) | 1.21 | 1.20 |
| —$CF_3$ (80°) | 1.18 | 0.98 |

From the data presented in TABLE III, it will be seen that high values of geometric index G corresponded with high values of $\Delta n_{max}$. For purposes of comparison, the theoretical maximum birefringence value $\Delta n_{max}$) for the recurring unit of poly(p-phenylene)terephthalamide (having a G value of 0.621 as shown in TABLE II) was also determined. The resulting $\Delta n_{max}$ value of 0.83 for poly(p-phenylene)-terephthalamide was higher than would be predicted from the geometric index value, G, of 0.621. This is believed to be the result of the highly crystalline nature of the poly(p-phenylene)terephthalamide material, whereas the geometric index G reflects the inherent anisotropy of an isolated chain independent of such macroscopic properties as morphology, density, color or the like.

The enhanced optical anisotropy exhibited by the preferred substituted-aromatic polyamide materials utilized in the optical devices hereof is believed to be the result of the rigid, rod-like uniaxial molecular structure of such materials and the amorphous/crystalline ratio thereof. This ratio typically ranges from about 10:1 to about 20:1. In the case of highly unidirectionally oriented phenyl-type polyamides this ratio generally will be in the range of about 0.3:1. The presence of crystallites is generally detrimental in polymeric materials adapted to utilization in optical devices owing to light scattering and diminished transparency. The non-coplanarity between substituted biphenyl rings, resulting from sterically bulky groups on the ortho positions of interbonded phenyl rings, raises the amorphous/crystalline ratio to a range of about 10:1 to about 20:1. This permits the fabrication of highly oriented films and fibers exhibiting high transparency in addition to high birefringence. The ring-substituted biphenyl polyamides additionally exhibit enhanced solubility and can be fabricated into colorless films or fibers where desired.

EXAMPLE 17

Geometric indices were determined for the repeating units of polymeric materials having the following structure

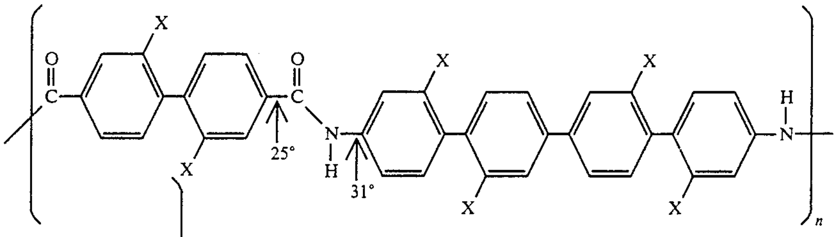

wherein each X is hydrogen or a substituent as set forth in the following TABLE IV. In the case of each recurring unit, the eccentricity factor $$\frac{1 + e_L}{1 + e_T}$$

was calculated and is reported in TABLE IV. Bond and group polarizability tensors were utilized to calculate a polarizability matrix for each repeat unit, the diagonalized form of the matrix providing the X, Y and Z contributions to the unit polarizability ellipsoid. Axial polarizabilities, i.e., X, Y and Z, were utilized to calculate longitudinal and transverse eccentricities of each repeat unit, thus, reflecting its symmetry.

Eccentricity values were calculated utilizing the procedure set forth in Example 15.

Literature-reported values of 25° and 31°, respectively, were utilized in all calculations as representing the dihedral angle between the phenyl and carbonyl moieties and the dihedral angle between the phenyl and amino moieties, respectively. Experimentally determined values for the dihedral angle between each X-substituted phenyl moiety were utilized in all calculations and are reported in TABLE IV. Mean diameter values, D, and length, L, were obtained from space-filling molecular models.

TABLE IV

| Substituent X (Dihedral Angle) | Mean Diameter (D) | Length (L) | $\left(\frac{1 + e_L}{1 + e_T}\right)$ | G |
|---|---|---|---|---|
| H (20°) | 4.52 | 29.80 | 0.938 | 1.373 |
| F (60°) | 4.66 | 29.80 | 1.155 | 1.640 |
| Cl (72°) | 4.84 | 29.80 | 1.166 | 1.594 |
| Br (75°) | 4.90 | 29.80 | 1.145 | 1.546 |
| I (85°) | 4.99 | 29.80 | 1.271 | 1.685 |
| $CF_3$ (80°) | 4.98 | 29.80 | 1.286 | 1.708 |
| $CH_3$ (71°) | 4.82 | 29.80 | 1.181 | 1.621 |

From the data presented in TABLE IV will be observed the influence of the nature of the X substituent relative to a hydrogen atom as regards the reported dihedral angle and resulting substantial noncoplanarity between interbonded phenyl rings. Differences in mean diameter and influence of the nature of X substituents on mean diameter and eccentricity factor, and correspondingly, geometric index G will also be observed. Thus, it will be noted that the largest substituents, i.e., $-CF_3$ and —I substituents, corresponded with the largest dihedral angles between interbonded phenyl groups or the highest non-coplanarity and, accordingly, recurring units having such substituents show high geometric index values.

EXAMPLE 18

A light-polarizing device utilizing a highly birefringent polyamide material was constructed in the following manner.

A sheet of birefringent material was prepared from the polyamide of Example 11, i.e., poly[2,2'-bis(trifluoromethyl)-4,4'-biphenylene]-trans-p,p'-stilbene dicarboxamide. The sheet was prepared by the "wet-jet" extrusion method described in Example 11. The resulting extruded polymer, in the form of a partially oriented transparent colorless film, was soaked in water and cut into strips. The strips were then further oriented by stretching in air in the manner also described in Example 11. A strip of the birefringent polymer (having perpendicular and parallel indices of refraction, respectively, of approximately 1.72 and 2.34 and an approximate thickness of 25 microns) was embossed by contacting one surface of the strip with a brass prismatic plate heated to a temperature of 180° C. and pressing the heated plate onto the surface of the film so as to provide a prismatic layer of birefringent material generally shown in FIG. 6 as layer 42.

Onto a sheet of transparent isotropic glass material of approximately one-mm. thickness was poured a layer of polychlorinated biphenyl, an isotropic material having an index of refraction of 1.654, available as Aroclor 1260 from Monsanto Company, St. Louis, Mo. The prismatic layer of birefringent material, prepared as aforesaid, was placed onto the layer of Aroclor. The prismatic layer was covered with a second layer of Aroclor so as to embed the prismatic layer in Aroclor material. A second sheet of glass was placed onto the Aroclor so as to sandwich the birefringent and Aroclor materials between the two pieces of glass. The resulting polarizer device was tested for its light polarizing properties by placing the test device and a second polarizer into the path of a light beam and by observing the attenuation of light resulting from rotation of the respective polarizers.

What is claimed is:

1. A multilayer light-transmitting device comprising, in assembled bonded relation: a layer of transparent molecularly oriented highly birefringent polymer comprising repeating molecular units exhibiting high electron density substantially cylindrically distributed about the long axes of the polymer material and the repeating units thereof, said highly birefringent polymer exhibiting a birefringence in relation to the molecular configuration of said repeating molecular units and the cylindrical or ellipsoidal electron density distribution about said axes, said birefringence being in relation to said molecular configuration and said electron density distribution according to a diminsionless geometric index G represented by the relationship $$G = 0.222 \times E \times \frac{L}{D}$$

wherein E is a dimensionless eccentricity factor defined by the relationship $$E = \frac{1 + e_L}{1 + e_T}$$

where $e_L$ is the longitudinal eccentricity of the electron polarizability of the repeating molecular unit and $e_T$ is the transverse eccentricity of the polarizability of the repeating molecular unit, L is the length of the repeating molecular unit along the main axis thereof and D is the mean diameter of the repeating molecular unit; said repeating molecular units of said birefringent polymer exhibiting a geometric index G of about 0.5 or higher; said multilayer light-transmitting device including at least one additional transparent layer having an index of refraction substantially matching one index of refraction of said layer of transparent molecularly oriented highly birefringent polymeric material and comprising isotropic or birefringent material; said at least one additional transparent layer, when a layer of birefringent material, having one index of refraction thereof substantially different from one index of refraction of said layer of transparent molecularly oriented highly birefringent polymer and having a molecular orientation substantially perpendicular to the molecular orientation of said molecularly oriented highly birefringent polymer.

2. The multilayer light-transmitting device of claim 1 wherein the repeating molecular units of said birefringent polymer exhibit a geometric index G of one or higher.

3. The multilayer light-transmitting device of claim 1 wherein said layer of transparent molecularly oriented highly birefringent polymer is bonded to a transparent layer having an index of refraction substantially matching one index of refraction of said transparent molecularly oriented highly birefringent polymer.

4. The multilayer light-transmitting device of claim 1 wherein said layer of transparent molecularly oriented highly birefringent polymer is bonded between two transparent layers, one transparent layer having an index of refraction substantially matching the lower index of refraction of said transparent molecularly oriented highly birefringent polymer.

5. The multilayer light-transmitting device of claim 4 wherein one of said two transparent layers has an index of refraction substantially matching the lower index of refraction of said transparent molecularly oriented highly birefringent polymeric material and the second of said two transparent layers has an index of refraction substantially matching the higher index of refraction of said transparent molecularly oriented highly birefringent polymer.

6. The multilayer light-transmitting device of claim 1 comprising an alternating arrangement of a plurality of layers of said molecularly oriented highly birefringent polymer and a plurality of said additional transparent layers, each said additional transparent layer having an index of refraction substantially matching one of the two indices of refraction of each said layer of said molecularly oriented highly birefringent polymer.

7. The multilayer device of claim 6 wherein each said additional transparent layer is isotropic.

8. The multilayer device of claim 1 wherein said molecularly oriented highly birefringent polymer comprises recurring units of the formula

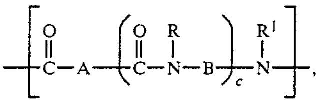

wherein each of A and B is a divalent radical except that B can additionally represent a single bond; R and $R^1$ are each hydrogen, alkyl, aryl, alkaryl or aralkyl; and c is zero of one; and wherein, when c is one, at least one of A and B is a divalent radical selected from the group consisting of:

(1) a radical

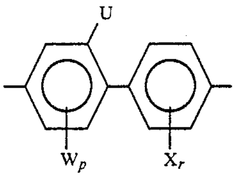

where U is a substituent other than hydrogen, each W is hydrogen or a substituent other than hydrogen, p is an integer from 1 to 3, each x is hydrogen or a substitutent other than hydrogen and r is an integer from 1 to 4, said U, wp and Xr substitution being sufficient to provide said radical with a non-coplanar molecular configuration; and (2) a radical

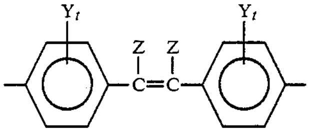

where each of Y and Z is hydrogen or a substituent other than hydrogen and each t is an integer from 1 to 4, with the proviso that when each said Z is hydrogen, at least one said Y substituent is a substituent other than hydrogen positioned on the corresponding nucleus ortho with respect to the

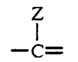

moiety of said radical, said Z and Yt substitution being sufficient to provide said radical with a non-coplanar molecular configuration; and wherein, when c is zero, A is a divalent radical selected from the group consisting of radicals (1) and (2) as hereinbefore defined.

9. The multilayer device of claim 8 wherein c of said recurring units is the integer one.

10. The multilayer device of claim 9 wherein said divalent radical A is a radical having the formula

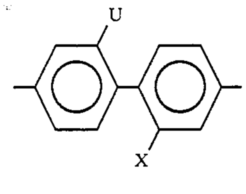

wherein each of U and X is a substituent other than hydrogen, and said divalent radical B is a radical having the formula

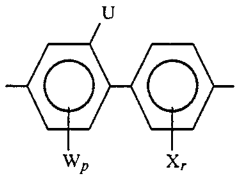

wherein U is a substituent other than hydrogen, each W is hydrogen or a substituent other than hydrogen, p is an integer from 1 to 3, each X is hydrogen or a substituent other than hydrogen and r is an integer from 1 to 4, said U, Wp and Xr substitution being sufficient to provide said radical with a non-coplanar molecular configuration.

11. The multilayer device of claim 10 wherein, in said radical A, each of said U and X substituents is halogen; and wherein, in said radical B, p is the integer one, r is the integer two and each X substituent is selected from the group consisting of halogen, alkoxy and substituted-alkyl.

12. The multilayer device of claim 11 wherein each said X substituent is trifluoromethyl.

13. The multilayer device of claim 9 wherein said divalent radical A is the radical having the formula

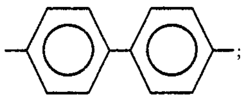

and said divalent radical B is a substituted-quaterphenylene radical having the formula

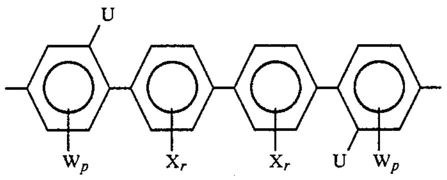

wherein each U is a substituent other than hydrogen, each W is hydrogen or a substituent other than hydrogen, each p is an integer from 1 to 3, each X is hydrogen or a substituent other than hydrogen and each r is an integer from 1 to 4, said U, Wp and Xr substitution being sufficient to provide said radical with a non-coplanar molecular configuration.

14. The multilayer device of claim 13 wherein said divalent radical B is a substituted-quaterphenylene radical having the formula

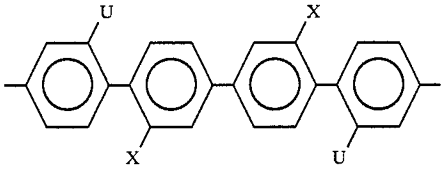

wherein each of U and X is a substituent selected from the group consisting of halogen, nitro, alkoxy and trifluoromethyl.

15. The multilayer device of claim 14 wherein each of said U and X substituents is trifluoromethyl.

16. The multilayer device of claim 9 wherein said divalent radical A is the radical having the formula

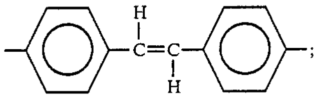

and said divalent radical B is a substituted-quaterphenylene radical having the formula

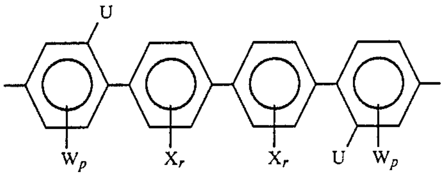

wherein each U is a substituent other than hydrogen, each W is hydrogen or a substituent other than hydrogen, each p is an integer from 1 to 3, each X is hydrogen or a substituent other than hydrogen and each r is an integer from 1 to 4, said U, $W_p$ and $X_r$ substitution being sufficient to provide said radical with a non-coplanar molecular configuration.

17. The multilayer device of claim 16 wherein said divalent radical B is a substituted-quaterphenylene radical having the formula

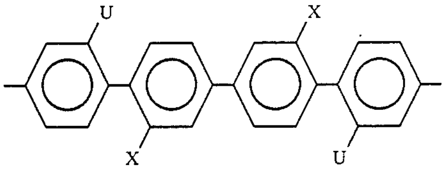

wherein each of U and X is a substituent selected from the group consisting of halogen, nitro, alkoxy and trifluoromethyl.

18. The multilayer device of claim 17 wherein each of said U and X substituents is trifluoromethyl.

19. The multilayer device of claim 1 wherein said molecularly oriented highly birefringent polymer exhibits a birefringence of at least about 0.2.

20. The multilayer device of claim 19 wherein said molecularly oriented highly birefringent polymer exhibits a birefringence of at least 0.4.

* * * * *